US007557696B2

(12) United States Patent
Brinton et al.

(10) Patent No.: US 7,557,696 B2
(45) Date of Patent: *Jul. 7, 2009

(54) SYSTEM AND PROCESS TO RECORD INSPECTION COMPLIANCE DATA

(75) Inventors: Brett A. Brinton, Seattle, WA (US); William Brinton, Jr., Seattle, WA (US); Daniel R. Mayer, Issaquah, WA (US); Eric S. Manegold, Federal Way, WA (US); Charles Michael McQuade, Issaquah, WA (US)

(73) Assignee: Zonar Systems, Inc., Seattle, WA (US)

( * ) Notice: Subject to any disclaimer, the term of this patent is extended or adjusted under 35 U.S.C. 154(b) by 655 days.

This patent is subject to a terminal disclaimer.

(21) Appl. No.: 10/915,957

(22) Filed: Aug. 11, 2004

(65) Prior Publication Data
US 2005/0040224 A1 Feb. 24, 2005

Related U.S. Application Data

(63) Continuation-in-part of application No. 10/219,892, filed on Aug. 15, 2002, now Pat. No. 6,804,626, which is a continuation-in-part of application No. 09/951,104, filed on Sep. 11, 2001, now Pat. No. 6,671,646.

(51) Int. Cl.
*B60Q 1/00* (2006.01)
(52) U.S. Cl. .................. 340/439; 340/442; 340/453; 340/576; 340/870.16; 340/933; 340/938; 702/83; 235/380
(58) Field of Classification Search .............. 340/438, 340/439, 933, 938, 441, 442, 453, 576, 870.16; 235/376, 380; 701/29, 35; 702/83
See application file for complete search history.

(56) References Cited

U.S. PATENT DOCUMENTS

| 3,990,067 | A | 11/1976 | Van Dusen et al. ........... 340/306 |
| 4,025,791 | A | 5/1977 | Lennington et al. .......... 250/341 |
| 4,258,421 | A | 3/1981 | Juhasz et al. ................ 364/424 |

(Continued)

OTHER PUBLICATIONS

Tsakiri, M et al. Abstract: "Urban fleet monitoring with GPS and GLONASS." *Journal of Navigation*, vol. 51, No. 3. Published Sep. 1998. 2pp. NDN-174-0609-4097-3.

(Continued)

*Primary Examiner*—Hung T. Nguyen
(74) *Attorney, Agent, or Firm*—Ronald M. Anderson

(57) ABSTRACT

An accessory (502) removably attached to a portable computing device (504) and handheld, portable readers (578, 141, 143, and 632) are used to generate and store data that indicate an operator was sufficiently close to each of a plurality of components during an inspection to actually inspect the components. The portable device includes a sensor that detects tokens such as radio frequency identification tags, which are affixed adjacent to the components. Messages appearing on a display and/or audible instructions from the portable reader prompt the operator to proceed to each checkpoint where the state of the component at that location is determined. The date, time and coordinates of each component's inspection (and optionally, the component's state) are included in the data produced by the portable reader. The data are temporarily stored in the portable reader and subsequently transferred to a remote data storage site.

15 Claims, 22 Drawing Sheets

U.S. PATENT DOCUMENTS

| | | | |
|---|---|---|---|
| 4,325,057 A | 4/1982 | Bishop | 340/539 |
| 4,763,356 A | 8/1988 | Day, Jr. et al. | 379/368 |
| 4,799,162 A | 1/1989 | Shinkawa | 364/436 |
| 4,804,937 A | 2/1989 | Barbiaux et al. | 340/52 F |
| 5,058,044 A | 10/1991 | Stewart et al. | 364/551.01 |
| 5,068,656 A | 11/1991 | Sutherland | 340/989 |
| 5,223,844 A | 6/1993 | Mansell et al. | 342/357.07 |
| 5,321,629 A | 6/1994 | Shirata et al. | 702/187 |
| 5,399,844 A | 3/1995 | Holland | 235/376 |
| 5,459,304 A | 10/1995 | Eisenmann | 235/380 |
| 5,557,254 A | 9/1996 | Johnson et al. | 340/426 |
| 5,557,268 A | 9/1996 | Hughes et al. | 340/933 |
| 5,572,192 A | 11/1996 | Berube | 340/574 |
| 5,585,552 A | 12/1996 | Heuston et al. | 73/116 |
| 5,600,323 A | 2/1997 | Boschini | 341/173 |
| 5,610,596 A | 3/1997 | Petitclerc | 340/825.23 |
| 5,671,158 A | 9/1997 | Fournier et al. | 345/8 |
| 5,680,328 A | 10/1997 | Skorupski et al. | 364/550 |
| 5,719,771 A | 2/1998 | Buck | 364/443 |
| 5,731,893 A | 3/1998 | Dominique | 359/379 |
| 5,808,565 A | 9/1998 | Matta | 340/994 |
| 5,874,891 A | 2/1999 | Lowe | 340/433 |
| 5,942,753 A | 8/1999 | Dell | 250/338.1 |
| 6,054,950 A | 4/2000 | Fontana | 342/463 |
| 6,078,255 A | 6/2000 | Dividock et al. | 340/539 |
| 6,128,959 A | 10/2000 | McGovern et al. | 73/660 |
| 6,236,911 B1 | 5/2001 | Kruger | 701/1 |
| 6,253,129 B1 | 6/2001 | Jenkins | 701/29 |
| 6,396,413 B2 | 5/2002 | Hines et al. | 340/825.49 |
| 6,438,472 B1 * | 8/2002 | Tano et al. | 701/35 |
| 6,505,106 B1 | 1/2003 | Lawrence | 701/35 |
| 6,594,621 B1 | 7/2003 | Meeker | 702/185 |
| 6,597,973 B1 | 7/2003 | Barich et al. | 701/29 |
| 6,609,082 B2 | 8/2003 | Wagner | 702/182 |
| 6,671,646 B2 | 12/2003 | Manegold et al. | 702/127 |
| 6,834,259 B1 | 12/2004 | Nicholson et al. | 702/187 |
| 6,894,617 B2 | 5/2005 | Richman | 340/573.1 |
| 7,027,955 B2 | 4/2006 | Markwitz et al. | 702/187 |
| 7,103,460 B1 * | 9/2006 | Breed | 701/29 |
| 2001/0053983 A1 | 12/2001 | Reichwein et al. | 705/1 |
| 2002/0147610 A1 | 10/2002 | Tabe | 705/1 |
| 2003/0030550 A1 | 2/2003 | Talbot | 340/433 |
| 2003/0033061 A1 | 2/2003 | Chen et al. | 701/33 |
| 2003/0109973 A1 | 6/2003 | Hensey et al. | 701/35 |
| 2003/0120745 A1 | 6/2003 | Katagishi et al. | 709/217 |

OTHER PUBLICATIONS

Anonymous. "Transit agency builds GIS to plan bus routes." *American City & County.* vol. 118, No. 4. Published Apr. 1, 2003. 4pp. NDN-258-0053-0664-6.

Qualcomm. "Object FX Integrates TrackingAdvisor with QUALCOMM's FleetAdvisor System; Updated Version Offers Benefit of Visual Display of Vehicles and Routes to Improve Fleet Productivity." Source: Newswire. Published Oct. 27, 2003. 4pp. NDN-121-0510-3002-5.

Dwyer, H.A., et al. Abstract: "Analysis of the Performance and Emissions of Different Bus Technologies on the city of San Francisco Routes." Technical paper published by Society of Automotive Engineers, Inc. Published Oct. 26, 2004. 2pp. NDN-116-0014-3890-6.

"Tracking out of route: software helps fleets compare planned routes to actual miles. (Technology)." *Commercial Carrier Journal.* Published Oct. 1, 2005. 4pp. NDN-219-1054-1717-0.

Senger, Nancy. "*Inside RF/ID: Carving A Niche Beyond Asset Tracking.*" Business Solutions. Feb. 1999: 5pp. Available at: <http://www.businesssolutionsmag.com/Articles/1999_02/990208.html>.

Kurtz, Jennifer. "*Indiana's E-Government: A Story Behind It's Ranking.*" Incontext Indiana;s Workforce and Economy. Jan.-Feb. 2003 vol. 4, No. 5pp. Available at <http://www.incontext.indiana.edu/2003/jan-feb03/governement.html>.

"*The Data Acquisition Unit Escorte.*" The Proxi Escort.com. Nov. 20, 2001. 4pp. Copyright © 2000 GCS General Control Systems. <http://www.gcs.at/eng/produkte/hw/escorte.htm>.

"*Detex Announces the Lastest Innovation in Guard Tour Verification Technology.*" DETEX Life Safety, Security and Assurance. Jan. 1, 2003. 1pp. © 2002-2004 Detex Corporation. <http://www.detex.com/NewsAction.jspa?id=3>.

Contact: GCS (UK), Tewkesbury Gloucestershire. Dec. 11, 2002. 2pp. Copyright © GCS General Control Systems <http://www.gcs.at?eng/newsallegemein.htm>.

Quaan et al., "*Guard Tour Systems.*" Security Management Online. Sep. 16, 2003. 1 pg. © 2000 <http://www.securitymanagement.com/ubb/Forum30/HTML/000066.html>.

Albright, Brian: "*Indiana Embarks on Ambitious RFID roll out.*" Frontline Solutions. May 20, 2002; 2pp. Available at: <http://www.frontlinetoday.com/frontline/article/articleDetail.jsp?id=19358>.

Spencer, Nancy. "*Maximize Your Exposure.*" Business Solutions. Feb. 1999: 5pp. Available at: http://www.businesssolutionsmag.com/Articles/1999_02/990208.htm>.

"*D.O.T. Driver Vehicle Inspection Reports on your wireless phone!*" FleeTTrakkeR$_{LLC}$ 2002-2003 FleeTTrakkeR$_{LLC}$. All rights reserved <http://www.fleettrakker.com/web/index.jsp>.

Want, Roy, "RFID A Key to Automating Everything." *Scientific American* (Jan. 2004): 58-65.

Tiscor: The Mobile Software Solutions Provider. *Inspection Manager: An Introduction.* nd. Slide Presentation; 19pp. Available: www.TISCOR.com.

"*Nextel, Motorola and Symbol Technologies Offer First Wireless Bar Code Scanner for Mobile Phones*" InvoiceDealers <http://www.theautochannel.com/news/2003/06/11/162927.html>.

"The PenMaster" and "The PSION Workabout." Copyright 2000 GCS General Control Systems. <http://www.gcs.at/eng/produkte/hw/penmaster.htm>.

* cited by examiner

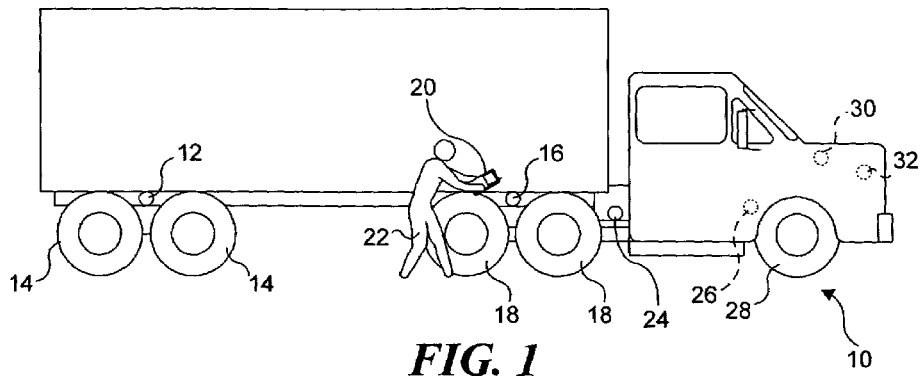
FIG. 1
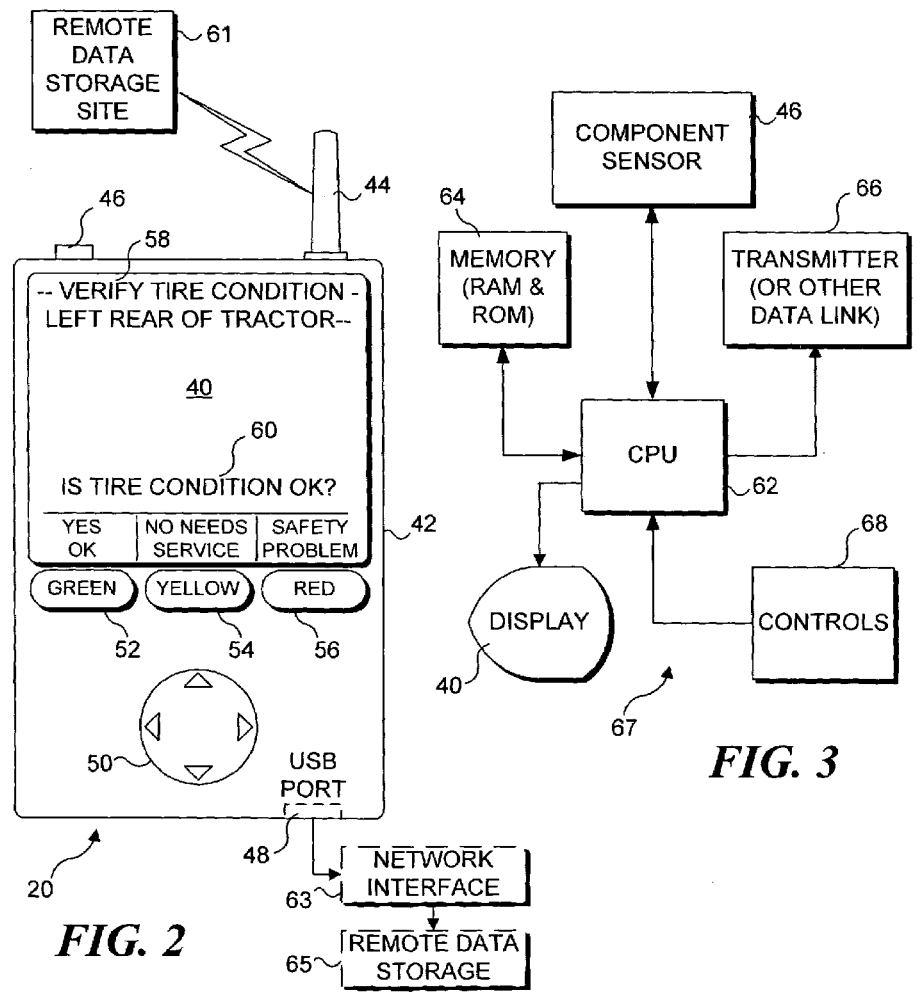
FIG. 2
FIG. 3

DRIVER'S VEHICLE INSPECTION REPORT
AS REQUIRED BY THE D.O.T. FEDERAL MOTOR CARRIER SAFETY REGULATIONS

CARRIER: _____

ADDRESS: _____

DATE: _____ TIME: _____ A.M. _____ P.M.

CHECK ANY DEFECTIVE ITEM AND GIVE DETAILS UNDER "REMARKS"

TRACTOR/
TRUCK NO. _____ ODOMETER READING _____

- ☐ AIR COMPRESSOR
- ☐ AIR LINES
- ☐ BATTERY
- ☐ BODY
- ☐ BRAKE ACCESSORIES
- ☐ BRAKES, PARKING
- ☐ BRAKES, SERVICE
- ☐ CLUTCH
- ☐ COUPLING DEVICE
- ☐ DEFROSTER/HEATER
- ☐ DRIVE LINE
- ☐ ENGINE
- ☐ EXHAUST
- ☐ FIFTH WHEEL
- ☐ FRAME AND ASSEMBLY
- ☐ FRONT AXLE
- ☐ FUEL TANKS
- ☐ GENERATOR

- ☐ HORN
- ☐ LIGHTS
  - HEAD - STOP
  - TAIL - DASH
  - TURN INDICATORS
- ☐ MIRRORS
- ☐ MUFFLER
- ☐ OIL PRESSURE
- ☐ RADIATOR
- ☐ REAR END
- ☐ REFLECTORS
- ☐ SAFETY EQUIPMENT
  - FIRE EXTINGUISHER
  - REFLECTIVE TRIANGLES
  - FLAGS - FLARES - FUSEES
  - SPARE BULBS & FUSES
  - SPARE SEAL BEAM

- ☐ SUSPENSION SYSTEM
- ☐ STARTER
- ☐ STEERING
- ☐ TACHOGRAPH
- ☐ TIRES
- ☐ TIRE CHAINS
- ☐ TRANSMISSION
- ☐ WHEELS AND RIMS
- ☐ WINDOWS
- ☐ WINDSHIELD WIPERS
- ☐ OTHER

TRAILER(S) NO.(S) _____

- ☐ BRAKE CONNECTIONS
- ☐ BRAKES
- ☐ COUPLING DEVICES
- ☐ COUPLING (KING) PIN
- ☐ DOORS

- ☐ HITCH
- ☐ LANDING GEAR
- ☐ LIGHTS - ALL
- ☐ ROOF
- ☐ SUSPENSION SYSTEM

- ☐ TARPAULIN
- ☐ TIRES
- ☐ WHEELS AND RIMS
- ☐ OTHER

REMARKS: _____
_____
_____
_____
_____
_____
_____

☐ CONDITION OF THE ABOVE VEHICLE IS SATISFACTORY

DRIVER'S SIGNATURE: _____
☐ ABOVE DEFECTS CORRECTED
☐ ABOVE DEFECTS NEED NOT BE CORRECTED FOR SAFE OPERATION OF VEHICLE
MECHANIC'S SIGNATURE: _____ DATE: _____

DRIVER'S SIGNATURE: _____ DATE: _____

*FIG. 7 (PRIOR ART)*

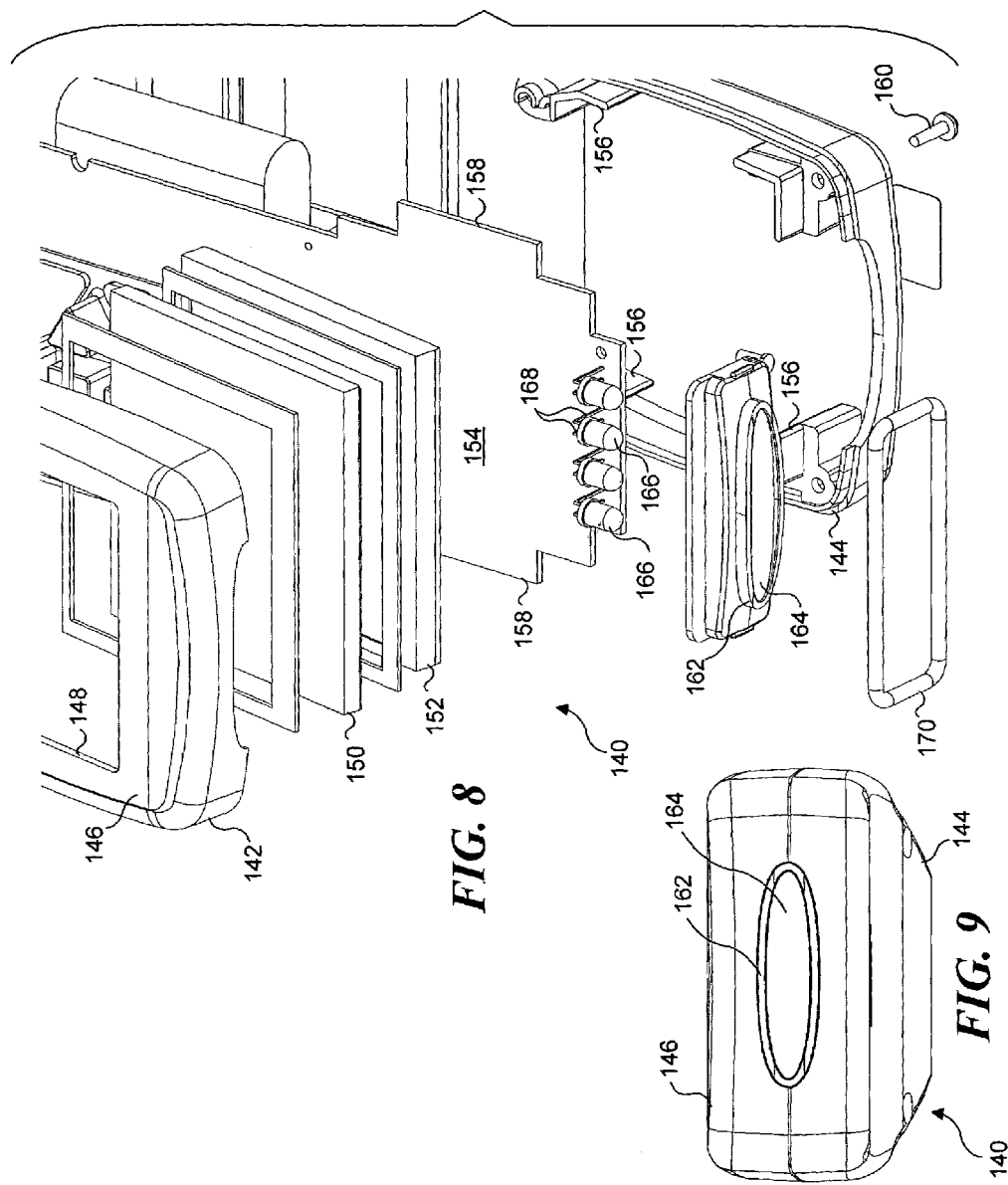

SYSTEM AND PROCESS TO RECORD INSPECTION COMPLIANCE DATA

RELATED APPLICATIONS

This application is a continuation-in-part of prior application Ser. No. 10/219,892, filed on Aug. 15, 2002, and now issued as U.S. Pat. No. 6,804,626 on Oct. 12, 2004, which itself is a continuation-in-part of prior application Ser. No. 09/951,104, filed on Sep. 11, 2001 and now issued as U.S. Pat. No. 6,671,646 on Dec. 30, 2003, the benefit of the filing dates of which is hereby claimed under 35 U.S.C. § 120.

FIELD OF THE INVENTION

The present invention generally provides evidence that a person was physically at a designated position while making an inspection of a component, and more specifically, provides an electronic record indicating when the person was physically disposed to carryout an inspection of the component.

BACKGROUND OF THE INVENTION

A recent network television news program reported that nearly 40 percent of big rig tractor-trailers were so dangerous that they would be ordered off the road if inspected. While not all accidents involving commercial trucks and trailers are the result of defective equipment that could be identified in a safety inspection, a significant reduction in accidents is likely to be achieved by taking steps to ensure that key components of such equipment are inspected.

In response to the public's concern for the increase in large vehicle traffic on our nation's highways and the increased frequency of reported accidents involving commercial vehicles, Congress adopted the Motor Carrier Safety Improvement Act of 1999 (PL 106-159). Pursuant to this Act, the Federal Motor Carrier Safety Administration (FMCSA) was created within the U.S. Department of Transportation (DOT). Part of the mission of this new agency is to develop a long-term strategy to "improve commercial motor vehicle, operator, and carrier safety." It is expected that by successfully addressing these issues, the incidence of accidents by commercial carriers will be reduced.

In furtherance of its mission, the FMCSA convened a series of meetings and planning sessions with representatives from other Federal agencies, the states, and the transportation industry. Through that process, FMCSA developed a policy entitled: "2010 Strategy—Saving Lives Through Safety, Innovation, and Performance." The primary goal of this policy is to improve transportation safety through the implementation of 31 strategic initiatives, which run the gamut from improved highway construction to better screening of drivers and equipment to detect potential equipment safety problems before they result in accidents.

The FMCSA's intention is to enhance motor carrier safety management practices through improved vehicle inspection, repair, and maintenance procedures. As acknowledged in the 2010 Strategy, "[I]f these functions are not conducted properly, driver and vehicle deficiencies can increase the potential for a crash." Among the nine separate strategies contemplated by FMCSA to achieve this important objective is "the introduction of new technology to improve safety performance." In stating its highest priorities, the 2010 Strategy further distills its 31 initiatives down to 13 "highest priority" strategies. Significantly, four of these highest priority strategies can be directly promoted with appropriate technology that will provide an electronic record of vehicle safety inspections and will tend to encourage such inspections. Specifically, it will be important to promote and encourage: (a) vehicle inspections with a focus on technology improvements; (b) improved safety management practices; (c) greater emphasis on technology transfer and deployment to achieve safe operating equipment; and (d) improved safety data collection and analysis.

To avoid accidents caused by defective equipment, Federal law presently requires that commercial drivers make a visual inspection of specific components on a truck (i.e., tractor and trailer), such as the brake system, fuel system, warning lights, tires, etc., performing pre- and post-trip inspections of these basic, but critical components. An exemplary vehicle inspection report listing the components and systems that must be inspected by a driver to satisfy the DOT regulations is illustrated in FIG. 7. However, under the current system, a driver is only required to fill out a paper log and keep it on file for 90 days. Many experts report that less than half of the drivers ever perform the check; instead, many drivers simply fill out the report while seated in the cab of the truck or in a coffee shop. The report is meaningless unless the listed components and systems have actually been inspected. For example, a driver who fails to actually inspect components on his vehicle will not notice that brake fluid is leaking from a hydraulic master brake cylinder. As a result, the brakes on the driver's truck may fail, potentially causing a serious accident.

A signed inspection report does not provide any assurance that a driver actually inspected the components included on the report. However, technology might provide a way to at least ensure that a driver (or other person doing a safety inspection) was physically present in the vicinity of each component requiring inspection, even if the driver is not compelled to affirmatively inspect all of the components. Most people, if required to actually walk to a component such as a tire of a truck, will then be more willing to at least look at the condition of the component, particularly if the task of indicating the condition of the component if there is a problem, is made relatively simple and efficient.

An analogous approach is employed to ensure that a night watchman visits different locations in a building. To provide evidence that he has made his rounds, the night watchman must use a key contained in a lock box at each different location to activate a handheld timekeeping device, making a record of the time that the location was visited. The night watchman thus provides proof of having visited each location for purposes of performing a security check at specified times. However, a night watchman cannot record a security or safety violation with the handheld timekeeping device. Further, requiring that a key be stored in a lock box on a truck or other system that is being inspected is not practical, and it is not efficient to require a driver or other person doing a safety inspection to manually use a first key to gain access to a second key to provide proof that the person physically visited the location during the safety/security inspection.

U.S. Patent Application Publication No. 2003/0120745 (Katagishi et al. hereinafter referred to as "Katagishi") indicates that the use of RFID tags for identifying products has been known since at least 2001. Katagishi also discloses a cell phone capable of reading RFID tags, as well as an accessory to be attached to a cell phone in order to enable the cell phone to read RFID tags. In addition, Nextel Communications Inc., Motorola, Inc., and Symbol Technologies, Inc. announced the availability of a bar code scanner attachment for mobile phones in an article published Jun. 11, 2003. Neither reference teaches or suggests using a cell phone to read bar codes or RFID tags in order to verify that a user was at a location corresponding to a required inspection point.

U.S. Pat. No. 5,680,328 discloses the use of electronic data entry equipment that simply takes the place of handwritten forms or checklists for recording data, but is unable to provide evidence that a person actually visited a component that was reportedly inspected.

There does not appear to be any prior art mechanical or electronic device designed to verify that a person was in a specific location for purposes of carrying out a safety inspection or any other inspection at that location. It would be desirable to provide a handheld device that automatically detects when the person is in the proximity of a component to be inspected, and enables a record to that effect to be produced.

SUMMARY OF THE INVENTION

The present invention utilizes portable devices, including a portable accessory configured to be removably attached to a portable computing device, to detect that a component was visited during an inspection, and to enable a record to that effect to be generated, either within the portable computing device or at a remote location.

At a minimum, the accessory includes a housing, a sensor, and an interface connection enabling the accessory to logically communicate with the portable computing device. The sensor detects when the accessory is within a predetermined maximum distance from a token that is disposed proximate to the component to be inspected and produces a signal in response thereto. The sensor may be configured to inductively couple to the token, to detect the token optically, or may be configured to detect at least one of a magnetic field, a radio frequency signal, an electric field, and an optical pattern.

The interface connection enables the accessory to communicate data with the portable computing device when the accessory is coupled to the portable computing device. The signal produced by the sensor is conveyed through the interface connection to the portable computing device and is stored therein and/or communicated to another device. As a result, the signal produced by the sensor provides the record that the component was visited during the inspection. The interface connection also includes a port that couples to a corresponding port on a portable computing device. The portable computing device is preferably either a personal computing device or a personal digital assistant and optionally includes a transmitter that enables the portable computing device to communicate with another device via wireless communications.

Optional components of the accessory also include a positioning subsystem component, a speaker (or other form of sound transducer, including a connection for a headphone), a light, and/or a transceiver. The positioning subsystem component is configured to determine a longitude coordinate and a latitude coordinate of the token when the sensor produces the signal indicative that the accessory is within the predetermined maximum distance from the token. Preferably, the positioning subsystem comprises a global positioning satellite (GPS) receiver, although positioning subsystems can also be implemented using receivers configured to determine position by triangulating signals from a plurality of transmitters (such as cell phone towers), or other such systems. The speaker provides an audible indication that the accessory is within the predetermined maximum distance from the token. Similarly, the light provides a visual indication that the accessory is within the predetermined maximum distance from the token. The transceiver enables the accessory to provide a wireless communication capability for the portable computing device.

Another aspect of the invention is directed to a method for providing a record that a component was visited during an inspection. The method includes the step of providing a portable device for use in recording data related to the inspection. In this case, it is assumed that the portable device does not include a sensor capable of detecting when the portable device is disposed proximate the component. Thus, another step provides for attaching a removable accessory to the portable device. The removable accessory including a sensor that detects when the accessory is disposed proximate the component and produces a first signal indicative thereof. An operator can move the portable device and the attached accessory proximate to the component, so that a record of the first signal produced by the sensor is automatically produced. This record thus provides evidence that the operator was sufficiently close to the component to make the inspection of the component.

Additional steps in this method include determining a longitude coordinate and a latitude coordinate of the component when the sensor detects when the accessory is disposed proximate the component by utilizing a global positioning satellite receiver and/or triangulating a second signal from a plurality of cellular telecommunication towers, storing the record within the portable device, where the record includes the longitude coordinate and the latitude coordinate of the component, and transmitting the record to an external device via a wireless communication. Alternatively, the portable device can be coupled to a data bus and the record transmitted to an external device via the data bus. In either case, an indication is provided to the operator when the sensor detects the accessory is proximate to the component.

The present invention is also directed towards a related method for providing a record that a component was visited during an inspection. This method includes the steps of providing a portable device for use in recording data related to the inspection, and enabling an operator to move the portable device proximate to the component. The portable device includes a sensor that detects when the portable device is disposed proximate to the component and produces a signal. A visual and/or audible indication is then provided to the operator when the sensor detects that the portable device is proximate to the component, and a record of the signal produced by the sensor is automatically produced. This record provides evidence that the operator was sufficiently close to the component to make a safety inspection of the component.

Another aspect of the present invention is directed towards a method for providing a record that a component was visited during an inspection. This method is substantially similar to the method discussed above. However; a primary difference is that audible prompts are provided to the operator to guide the operator through the inspection.

Still another substantially similar method differs from the preceding methods in that instead of storing a record of the signal produced by the sensor in the portable device used to detect the token, the record is immediately transmitted to a remote device using a wireless transmitter that is integrated into the portable device. The record is stored at the remote device.

Other aspects of the present invention are directed to a portable reader that detects a token disposed adjacent to a component to be inspected and generates a record as evidence that an operator was in a position to conduct an inspection of the component. The portable reader includes a housing, a sensor, a processor, a power supply, and a data port. An embodiment of the portable reader includes a positioning subsystem configured to determine a longitude coordinate and a latitude coordinate of the token when the sensor produces the signal indicating that the housing is proximate to the token. The sensor detects when the portable reader is proximate to the checkpoint during the inspection and produces a signal indicative thereof. The processor controls the functions of the portable reader and preferably comprises a central processing unit controlled by software, or an application specific integrated circuit (ASIC). The power supply energizes the portable reader and any optional components and preferably comprises a battery. The data port enables the sensor signal or an inspection record generated by the processor to be transmitted to a remote device. In at least one embodiment, the data port enables a physical connection to be made with another device, while in at least another embodiment, the data port is coupled to a wireless transmitter.

In at least one preferred embodiment of a portable reader, an indicator is included to enable an operator to receive an indication that the sensor has detected a token, which ensures that the operator does not move to a new inspection point until the sensor has detected the token at a current inspection point. The indicator can include one or more of a speaker that emits a tone or message indicating the sensor has detected a token, a light that illuminates or flashes to indicate that the sensor has detected a token, or a display that uses text or images to indicate that the sensor has detected a token.

In another preferred embodiment of the portable reader, a memory stores audio data that is used by the processor to generate audible prompts through the speaker, to guide an operator through an inspection. In this embodiment of the portable reader, a display is not required, but may optionally be included.

In still another preferred embodiment of the portable reader, the processor records a time and a date when the sensor detects a token. Preferably, this embodiment of the portable reader is implemented in a minimal size and shape form factor, such as a cylinder that can be readily carried in one hand.

In yet another embodiment of the portable reader, the data port of the portable reader is coupled to a wireless transmitter, and the processor of the portable reader immediately transmits either inspection data generated by the processor, based on the signal from the sensor, or the sensor signal, to a remote device. No inspection data or record of the sensor signal need be stored in the portable reader. When this embodiment is implemented with an ASIC control, the portable reader does not require any memory.

Another aspect of the present invention is directed towards a system for providing evidence that a component was visited during an inspection. The system includes a token, a portable device for reading the token, and a memory in which the record is stored. The token is disposed adjacent to a component that is to be inspected. The portable device is configured to be transported to each component to be inspected, and includes a housing, a sensor configured to detect when the portable device is within a predetermined maximum distance from the token and adjacent to the component to be inspected, and a controller coupled to the sensor. The portable device can optionally include a positioning subsystem configured to determine a longitude coordinate and a latitude coordinate of the token when the sensor produces the signal indicating that the housing is proximate to the token. The controller generates a record providing evidence that the component was visited during the inspection and comprises either hardware logic or a processor controlled by software. Optional elements of the portable device include a light source for illuminating a component to facilitate its inspection, a speaker that is used to provide an audible indication that the portable device is within a predetermined maximum distance from the token, and a light that is illuminated to provide a visual indication that the portable device is within a predetermined maximum distance from the token.

In one embodiment, the token produces a pattern of magnetic flux detected by the sensor so that the signal from sensor uniquely identifies the token. Or, in another embodiment, the token comprises an optical pattern detected by the sensor, which produces a corresponding signal that uniquely identifies the token. The token is disposed in a position selected to ensure that in order for an operator to move the portable device proximate to the token, the operator is positioned to become aware of a condition of the component that is proximate the token. Alternatively, the token may be disposed at a rear of an interior passenger space in a vehicle, so that a person must move through the interior passenger space to position the portable device proximate to the token, thereby facilitating an inspection of the interior passenger space. The system also preferably comprises a plurality of additional tokens, each additional token being disposed adjacent to another component to be inspected.

In one embodiment of the system, the portable device includes an indicator that enables an operator to receive an indication that the sensor has detected a token. The indicator comprises one or more of a speaker that emits a tone or message indicating the sensor has detected a token, a light that illuminates, or blinks to indicate that the sensor has detected a token, or a display that presents text or images to indicate that the sensor has detected a token.

In another embodiment of the system, the portable device includes a memory in which audio data are stored, and a speaker. The controller of the portable device uses the audio data to generate audible prompts to guide an operator through an inspection. In this embodiment, a display is not required.

In yet another embodiment of the system, the portable device includes a wireless transmitter. The controller of the portable reader is configured to immediately transmit either inspection data generated by the processor based on a signal from the sensor, or the sensor signal, to the memory, which is included at a remote device. No inspection data or record of the sensor signal need be stored in the portable device.

Another aspect of the invention is directed towards a portable data recorder for recording data during a safety inspection. The data at least indicates whether a checkpoint was visited during the safety inspection by an operator carrying the portable data recorder. It includes a housing; a display mounted on the housing; an operator interface mounted on the housing to enable input and selection of options provided on the display; a memory in which machine instructions and data are stored; and a sensor for detecting when the portable device is proximate each of a plurality of checkpoints during the safety inspection. When the portable data recorder is disposed adjacent to the checkpoint, the sensor produces a signal indicating that the housing is proximate to the checkpoint.

One embodiment of the portable data recorder also includes a positioning subsystem configured to determine a longitude coordinate and a latitude coordinate of the portable data recorder when the sensor produces the signal indicating that the housing is proximate to the checkpoint. This portable data recorder further includes a controller coupled to the display, the memory, the operator interface, the sensor, and the positioning subsystem, the controller executing machine instructions to causes the memory to store data indicative of each checkpoint visited during the safety inspection (including the position data), in response to the signal produced by the sensor.

Yet another aspect of the invention is directed to a method for providing a record that a component was visited during a safety inspection, wherein the record includes positional data. The method includes the steps of providing a portable device for use in recording data related to the safety inspection. The portable device includes a sensor that detects when the portable device is disposed proximate the component and produces a first signal indicative thereof. Another step enables an operator to move the portable device proximate the component. Other steps include automatically producing a record of the first signal produced by the sensor that is stored within the portable device. The record provides evidence that the operator was sufficiently close to the component to make a safety inspection of the component. Optionally, positional data (i.e., a longitude coordinate and a latitude coordinate of the component) are recorded when the sensor detects when the portable device is disposed proximate to the component. The step of determining positional data involves either utilizing a GPS receiver to receive positional data from a plurality of GPS satellites, or using a receiver configured to receive signals from a plurality of cellular telecommunication towers or other transmitters. The signals received are processed to determine the positional data, which are included in the record for the component that is stored for subsequent access.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 1 is a schematic diagram of a tractor and trailer equipped with tokens at each component to be inspected, illustrating a person using a portable device in accord with the present invention;

FIG. 2 is a top plan view of a portable device for use in making a safety inspection of a tractor and trailer, showing a message that prompts the operator to inspect the left rear tires of the tractor;

FIG. 3 is a schematic block diagram of the functional components included in the portable device of FIG. 2;

FIG. 7 (Prior Art) is an exemplary manually-completed inspection record used for safety inspections of tractors and trailers, illustrating the specific components and systems that are required to be inspected;

FIG. 8 is an exploded isometric view of a portion of a second embodiment of the portable device that includes a plurality of lights;

FIG. 9 is an isometric view of a front portion and lower surface of the second embodiment of FIG. 8;

DESCRIPTION OF THE PREFERRED EMBODIMENT

Utility of the Present Invention

Figure 4:
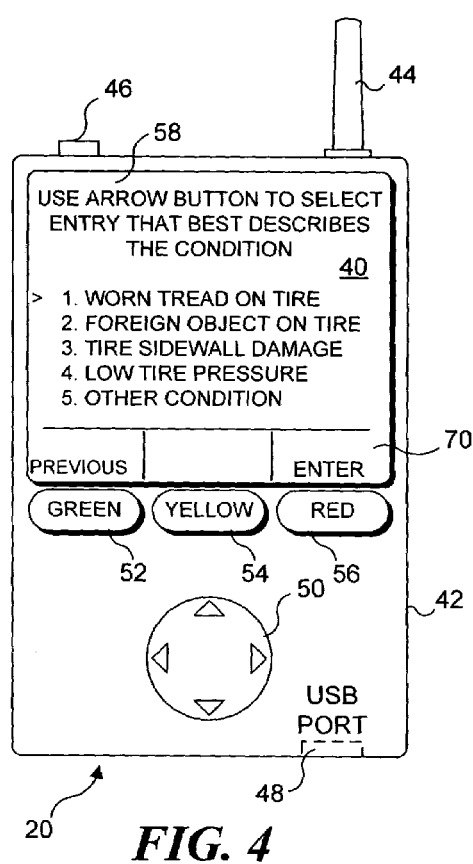
FIG. 4 is a top plan view of the portable device of FIG. 2, illustrating a menu that indicates possible conditions of tires in need of service.

The present invention is applicable in recording data resulting from a safety inspection or other inspection of almost any type of equipment, apparatus, or system and is applicable to other types of inspections in which it is desirable to maintain a data record as evidence that the person making the inspection was actually physically present at a checkpoint or component requiring inspection. While the data accumulated with the present invention is not conclusively presumptive evidence that each component of a system was indeed carefully inspected, in most cases, if a person is required to visit a checkpoint or component, it is very likely that the person will actually inspect the component. By encouraging a person making an inspection to be physically close enough to a component to carry out an inspection, and by providing evidence of that fact in the data recorded, there is at least some justification in assuming that the person actually did the inspection.

FIG. 1 illustrates a tractor-trailer 10 with which an embodiment of the present invention is usable to carry out a safety inspection. Tractor-trailer 10 is provided with a plurality of tokens affixed adjacent to each checkpoint or component that is to be inspected. While only a few of the tokens are illustrated in FIG. 1, FIG. 7 (Prior Art) lists all of the components or systems that should be inspected if a driver is to be in compliance with the DOT regulations regarding pre- and post-inspections of such vehicles. A token will preferably be affixed adjacent to the components and systems listed in FIG. 7, although several components might be associated with the same token. For example, in the engine compartment, one token might be used for both the radiator and the belts. As a driver moves about the tractor and trailer, evidence that the driver or the person doing the inspection was sufficiently close to the components being inspected so that the inspection could actually take place is recorded in a first embodiment of a portable device 20. Further details of portable device 20 and of other related embodiments are described below.

For the few tokens illustrated in FIG. 1, the relevance of the disposition of the token adjacent to a corresponding component of the tractor-trailer 10 should be evident. For example, token 12 is disposed adjacent to tandem dual rear tires 14 on the trailer. Since all of the tires of the tandem dual rear wheels on the left rear of the trailer are readily visible from a position adjacent to token 12, a single token is sufficient to determine that the driver was sufficiently close so that all four tires at the left rear of the trailer could readily be inspected. Similarly, tandem dual wheels 18 on the left rear of the tractor are readily inspected when an observer 22 is positioned as shown in FIG. 1. In this position, the observer moves portable device 20 within a maximum predefined range of token 16, which is exposed above tandem dual wheels 18. Portable device 20, detects and responds to token 16, recording data indicating that the driver was in a position to inspect tandem dual rear wheels 18 on the tractor. It is contemplated that the operator may initiate the recognition of a token by activating a switch, or the portable device can instead simply respond when a token is sufficiently close to the portable device.

Other tokens 24, 26, 30, and 32 are illustrated adjacent to other components of the tractor that are part of the safety inspection. For example, token 26 is affixed adjacent to a tire 28, which is disposed on the right front of the tractor, while tokens 30 and 32 are accessible if the front hood of the tractor is opened and are disposed adjacent the hydraulic brake master cylinder and the engine belts/radiator, respectively (not shown separately).

For each token, there is a predetermined maximum distance that portable device 20 can be held from the token while still enabling the portable device to detect the token, and thus, the component that is associated with it, in order to produce a record as evidence that the person holding the portable device was in a position to inspect the component. Depending upon the component to be inspected and the type of token, different predetermined maximum distances may be associated with the various components. The different predetermined maximum distances might be achieved by partially shielding a token to vary the distance at which the portable device can detect the token.

Operator 22 is prompted to approach the next component in a series of components that must be checked during the safety inspection, by displaying a message 58 on a display 40 of portable device 20, as shown in FIG. 2. For example, if operator 22 has just completed the inspection of tandem dual tires 14 on the left rear of the truck, display 40 provides a prompt 58 indicating that the operator should "verify tire condition—left rear of tractor." A sensor 46 on portable device 20 responds to token 16 when the portable device is held less than the predetermined maximum distance from token 16, by producing a signal indicating that the portable device is within the required range of tandem dual tires 18 to enable the operator to inspect the tires. Display 40 also provides a prompt 60 to operator 22 requesting that the operator indicate whether the tire condition is okay. If so, the operator presses a green control button 52 corresponding to the message "YES, OK." However, in this first embodiment of the portable device, if during the visual inspection of the tires, the operator determines that they require servicing, the operator is prompted to depress a yellow control button 54 on the portable device. (The other embodiments of the portable device that are described below do not include a yellow control button, but instead invite the operator to indicate the condition of the component.)

Certain conditions, such as a tread separation or a nail or other sharp object lodged in the tire, would likely lead the person doing the inspection to depress a red control button 56, indicating a safety problem that requires the operator to contact a supervisor, who will likely elect to delay the trip until the component is repaired and/or replaced, or take other appropriate action, depending upon the nature of the component and the type of problem that makes the component unsafe. Portable device 20 also includes a cursor control 50, which is a four-position switch that enables a cursor (not shown in this Figure) to be moved up or down, and left or right. Cursor control 50, green, yellow, and red control buttons 52, 54, and 56, and display 40 are all disposed on a front surface of a housing 42 of portable device 20. Sensor 46 is disposed on the top edge of housing 42, while an optional universal serial bus (USB) port 48 is disposed on the bottom edge of housing 42, opposite from the end at which sensor 46 is disposed.

In this embodiment, an antenna 44 is also disposed on the top edge of the housing for transmitting radio frequency (RF) transmissions to a remote data storage site 61 that is used for long-term storage of data resulting from safety inspections. The data produced by a safety inspection indicates each of the components of the vehicle (or other system or apparatus being inspected) that were visited by the operator, who positioned the portable device within the predetermined maximum distance from the token associated with the component, and further indicates the status of the component. In the event that the component appears to need service or represents a safety problem (as would be evident if the operator depressed yellow control button 54 or red control button 56, respectively), the operator is prompted to select one of a plurality of predefined conditions that justify the state of the component determined by the operator and best represent its observed condition.

If the state of the component is okay so that green control button 52 is depressed, i.e., if the component does not require any service or is usable or otherwise within its nominal operating parameters, there is no need to provide an indication of the condition of the component. The condition need only be recorded as part of the data stored in the portable device if either yellow control button 54 or red control button 56 is depressed by the operator to indicate the state of the component being other than "OK."

A further example illustrating the selection of a condition relating to the example shown in FIG. 2 is included in FIG. 4. As shown in FIG. 4, if the operator has indicated that the state of the tires is such that they need service, by pressing yellow control button 54, portable device 20 automatically displays several possible conditions that might lead an operator to indicate that state. In the example shown, message 58 prompts the operator to use the arrow button (i.e., cursor control 50) to select a possible condition from among the listed options that best describes the observed condition of the tires. Display 40 includes five possible conditions, the last of which covers any condition that might not be included among the first four that are listed. Using cursor control 50, the operator can move the cursor to the displayed statement that best describes the observed condition of the tire and then can depress red control 56, which corresponds to an "Enter" menu option 70 on display 40 for this screen. Green control 52 can be depressed to select a "Previous" display, if the operator elects to reconsider the state of the component that was previously selected.

FIG. 3 illustrates functional components 67 that are included in portable device 20, either on or inside housing 42. A central processing unit (CPU) 62 comprises the controller for portable device 20 and is coupled bi-directionally to a memory 64 that includes both random access memory (RAM) and read only memory (ROM). Memory 64 is used for storing data in RAM and machine instructions in ROM that control the functionality of CPU 62 when executed by it. CPU 62 is also coupled to receive operator input from controls 68. Collectively, controls 68 include green control button 52, yellow control button 54, red control button 56, and cursor control 50. In addition, CPU 62 provides text and graphics to display 40 for the prompts and other messages, and menu items and options from which the operator can select, using cursor control 50.

After operator 22 has visited each of the checkpoints required for the safety inspection, the operator can optionally transmit the data that have been collected during the inspection to remote data storage site 61 through an RF transmission via antenna 44. The data provide evidence that the operator has visited the components and indicate the state and condition of the components that were visited and inspected, based on the operator input. Alternatively, optional USB port 48 on portable device 20 can be coupled to a network interface 63 on an external cradle or docking station (an example of which is described below in connection with other embodiments of the portable device), which is in communication with remote data storage 65, as shown in FIG. 2. In FIG. 3, CPU 62 is shown communicating data to transmitter 66 (or through another data link) using a wire and/or wireless data communication link. The data collected and stored in memory 64 of portable device 20 during the safety inspection can thus be safely transferred to the remote data storage site and retained for as long as the data might be needed.

In some cases, it may be preferable to transmit the data to the remote site immediately after making a safety inspection to ensure that the data retained in memory 64 are not lost, should an accident occur that destroys portable device 20. An accident destroying the evidence that the safety inspection was implemented could have an adverse effect during any litigation related to the accident, which might allegedly have been caused by one of the components inspected. However, since the risk of such an accident is relatively remote, it is contemplated that an operator may collect the data from a number of safety inspections in memory 64 and then subsequently upload the data to remote data storage 65 by coupling the data to the external cradle or docking station that includes a USB port terminal and network interface to communicate with a remote storage over the Internet or other network. The cradle or docking station might be maintained by a carrier company at a freight terminal at least periodically visited by the truck that was inspected.

Alternatively, the external cradle or docking station might be disposed at a different site and/or connect to the remote data storage site through other types of communication links. One example of such a communication system is the OMNITRACS™ satellite mobile communication system sold by Qualcomm Corporation that enables drivers on the road and carriers to remain in communication with each other and enables the carrier to monitor the location of a tractor-trailer during a trip. By linking portable device 20 through USB port 48 to such a data communication system, the data stored within memory 64 can readily be transmitted to a remote site maintained by the carrier for long-term storage, even while a trip is in progress.

The tokens that are affixed at various points on the tractor-trailer (or adjacent components of other types of systems or apparatus unrelated to a vehicle) can be of several different types, depending upon the type of sensor 46 that is included on portable device 20. In a preferred form of the present invention, the token that is preferably employed is a radio frequency identification (RFID) tag that is attached with a fastener or an appropriate adhesive to a point on a frame or other support (not shown) adjacent to the component associated with the token. One type of RFID tag that is suitable for this purpose is the WORLDTAG™ token that is sold by Sokymat Corporation. This tag is excited by an RF transmission from portable device 20 via antenna 44. In response to the excitation energy received, the RFID tag modifies the RF energy that is received from antenna 44 in a manner that specifically identifies the component associated with the RFID tag, and the modified signal is detected by sensor 46.

An alternative type of token that can also be used in this invention is an IBUTTON™ computer chip, which is armored in a stainless steel housing and is readily affixed to a frame or other portion of the vehicle (or other type of apparatus or system), adjacent to the component associated with the IBUTTON chip. The IBUTTON chip is programmed with JAVA™ instructions to provide a recognition signal when interrogated by a signal received from a nearby transmitter, such as from antenna 44 on portable device 20. The signal produced by the IBUTTON chip is received by sensor 46, which determines the type of component associated with a token. This type of token is less desirable since it is more expensive, although the program instructions that it executes can provide greater functionality.

Yet another type of token that might be used is an optical bar code in which a sequence of lines of varying width or other optical pattern encode light reflected from the bar code tag. The encoded reflected light is received by sensor 46, which is then read by an optical detector. Bar code technology is well understood by those of ordinary skill in the art and readily adapted for identifying a particular type of component and location of the component on a vehicle or other system or apparatus. One drawback to the use of a bar code tag as a token is that the bar code can be covered with dirt or grime that must be cleaned before the sequence of bar code lines or other pattern can be properly read. If the bar code is applied to a plasticized adhesive strip, it can readily be mounted to any surface and then easily cleaned with a rag or other appropriate material.

Yet another type of token usable in the present invention is a magnetic strip in which a varying magnetic flux encodes data identifying the particular component associated with the token. Such magnetic strips are often used in access cards that are read by readers mounted adjacent to doors or in an elevator that provides access to a building. However, in the present invention, the magnetic flux reader comprises sensor 46 on portable device 20. The data encoded on such a token are readily read as the portable device is brought into proximity of the varying magnetic flux encoded strip comprising the token.

As yet another alternative, an active token can be employed that conforms to the BLUETOOTH™ specification for short distance data transfer between computing devices using an RF signal. However, it is likely that the range of the signal transmitted by the token would need to be modified so that it is substantially less than that normally provided by a device conforming to the BLUETOOTH specification. It is important that the portable device be able to detect that it is proximate to the component only within a predetermined maximum range selected to ensure that the operator is positioned to actually carry out an inspection of the component.

Logical Steps Implemented in the Present Invention

Figure 5:
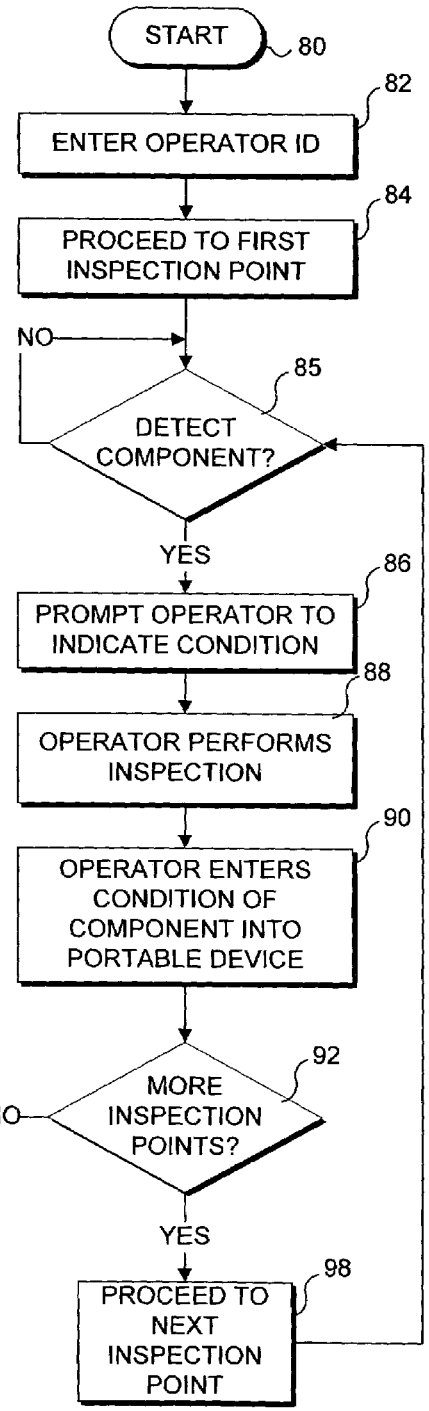
FIG. 5 is a flow chart showing the steps followed in carrying out a safety inspection in accord with the present invention.

FIG. 5 illustrates the logical steps implemented in connection with the present invention to carry out a safety inspection of a vehicle or other apparatus or system. From a start block 80, a step 82 provides for manual entry of an operator identification (ID) into a data record, or the operator ID can already be stored in memory of the portable device, or can be automatically entered in response to a special operator ID tag disposed on the vehicle. Cursor control 50 is employed to sequentially select digits from a displayed list, to input the operator ID for the individual making the safety inspection. The operator ID might be a four (or more) digit number or alphanumeric code. Alternatively, a plurality of possible operator IDs might be displayed as a list on portable device 20, enabling the operator to select his/her operator ID from the list using cursor control 50 and one of the three control buttons.

Once the operator ID is entered, portable device 20 prompts the operator to proceed to a first inspection point at a step 84. For example, as indicated in FIG. 2, message 58 prompts the operator to verify the tire condition on the left rear of the tractor. A decision step 85 determines if the portable device has detected the token associated with the component that is next to be inspected. If not, the logic loops until the component is detected. Once sensor 46 on portable device 20 has detected the token associated with the current component to be inspected, the logic then advances to a step 86 in which the operator is prompted to indicate a state of the component (and possibly, its condition). In a step 88, the operator performs the inspection, which may involve visually observing the state and condition of the component, or carrying out other steps that might be required to confirm the state and condition of the component. It is contemplated that in some types of inspections, a series of one or more steps might be required to test the component to determine if it is operating properly, needs maintenance or repair, or is unusable. Again, portable device 20 can be programmed to provide appropriate prompts to direct the operator through the series of steps required to carry out the inspection of such a component. Accordingly, in a step 90, the operator selectively enters the condition of the component into portable device 20 using the control buttons and cursor control 50.

A decision step 92 determines if there are further inspection points in the safety inspection currently being carried out. If not, a step 94 provides for transmitting or loading the inspection data into storage at a remote site; this step can be done immediately after the inspection is completed, or at some later time, perhaps after additional safety inspections have been completed, and/or after the portable device has been inserted into the external cradle or docking station. Once the data are transmitted to the remote site for long-term storage, the process is completed in a step 96.

Assuming that further inspection points remain in the safety inspection at decision step 92, a step 98 provides for the operator to proceed to the next inspection point, which will again be determined by a prompt displayed to the operator on display 40 of portable device 20. The logic then loops back to decision step 85, which determines if the sensor on the portable device has detected the component, indicating that the portable device is within the predefined maximum range of the token, thus ensuring that the operator is sufficiently close to the component to inspect it.

Figure 6:
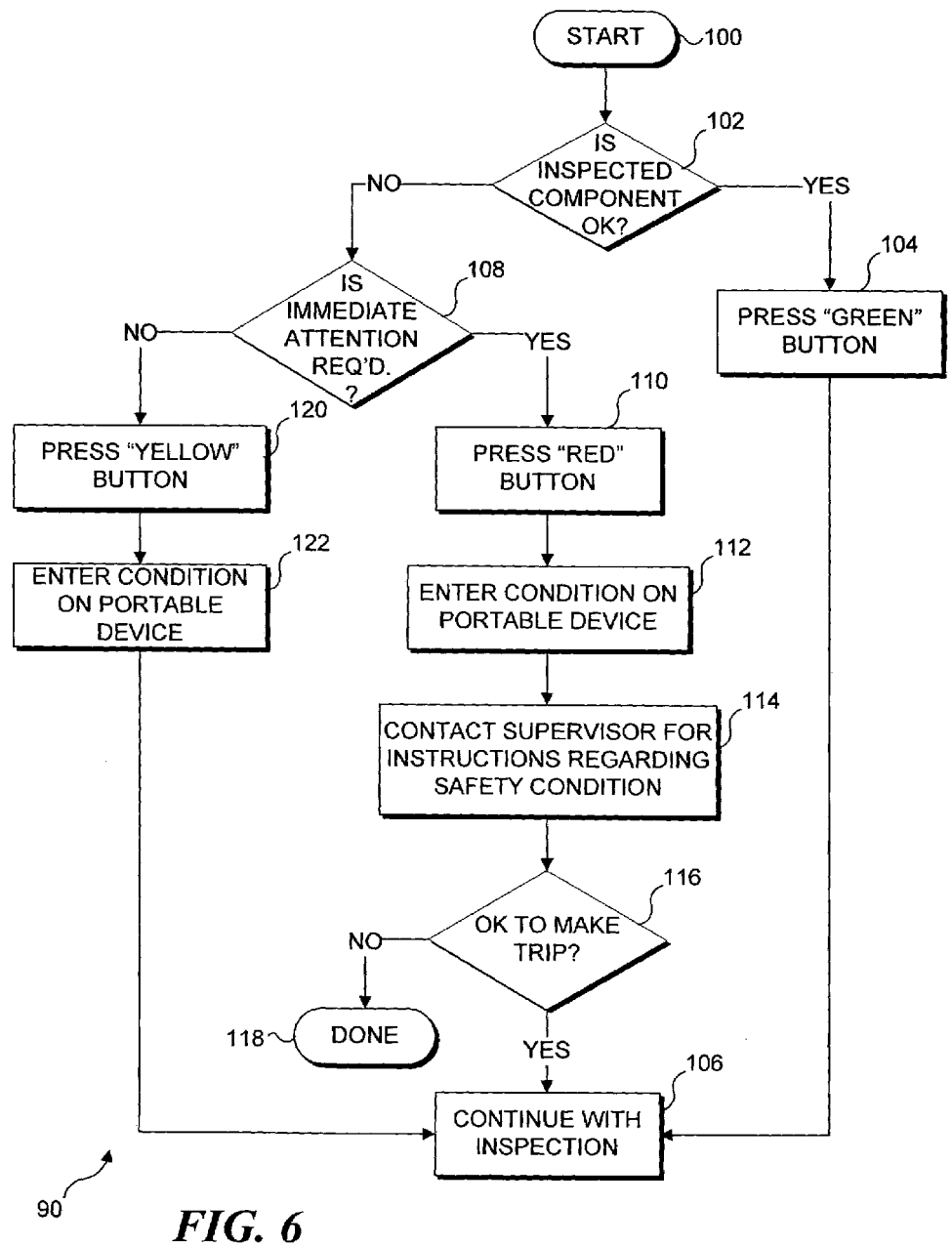
FIG. 6 is a flow chart illustrating the steps employed in recording a condition of a component that is being inspected using the portable device of FIGS. 2 and 4.

Further details of step 90 are illustrated in FIG. 6. From a start block 100, a decision step 102 determines if the inspected component is okay. If so, the operator presses green control button 52 in a step 104. Since the component is okay, nothing further is required for that component, and the logic then proceeds to a step 106, which provides that the operator can continue with the inspection, i.e., proceed with decision step 92 in FIG. 5.

However, if the determination in decision step 102 indicates that the inspected component is not okay, a decision step 108 enables the operator to determine if immediate attention is required. If so, the operator presses red control button 56 at a step 110 and enters the condition of the component on the handheld unit. For example, if the operator is inspecting a tire and determines that the tread of the tire is separating, i.e., that the tire should not be used but should instead be replaced, the operator would use the cursor control on the portable device to select an option for the condition "tread separating from tire" at a step 112. In many types of inspections, the operator will be required to contact a supervisor for instructions regarding the safety condition, at a step 114. In the example just noted, the supervisor would likely arrange for the tire to be replaced by maintenance or repair personnel before the operator makes a trip in the vehicle.

In some cases, a supervisor might override the operator's determination of the state of the component based upon the reported condition. Therefore, a decision step 116 determines if the supervisor has given authorization to the operator to make the trip, scheduling a later repair of the component. If so, the logic proceeds to step 106, in which the operator continues with the inspection as described above. If not, there is no further need to inspect the remainder of the vehicle at that point, since the complete inspection will need to be carried out again after the unsafe condition has been corrected, e.g., by replacing the defective tire. The logic is then done, as indicated in step 118.

In the event that the operator determines that immediate attention is not required at decision step 108, at a step 120, the operator presses yellow control button 54 on portable device 20. The operator then selects and enters the condition noted on the portable device, as indicated in a step 122. In the example shown in FIG. 4, six possible conditions are indicated by statements on display screen 40 for a tire that is still usable but needs service. In this case, the operator employs cursor control 50 to move the cursor to a selected statement that thus describes the observed condition of the component and then depresses red control button 56 to enter the condition, creating a record of the state and condition of the component currently being inspected that is retained within the memory of the portable device. Thereafter, the logic proceeds to step 106, in which the operator continues with the inspection.

Alternative Embodiments of Portable Device

Figure 10:
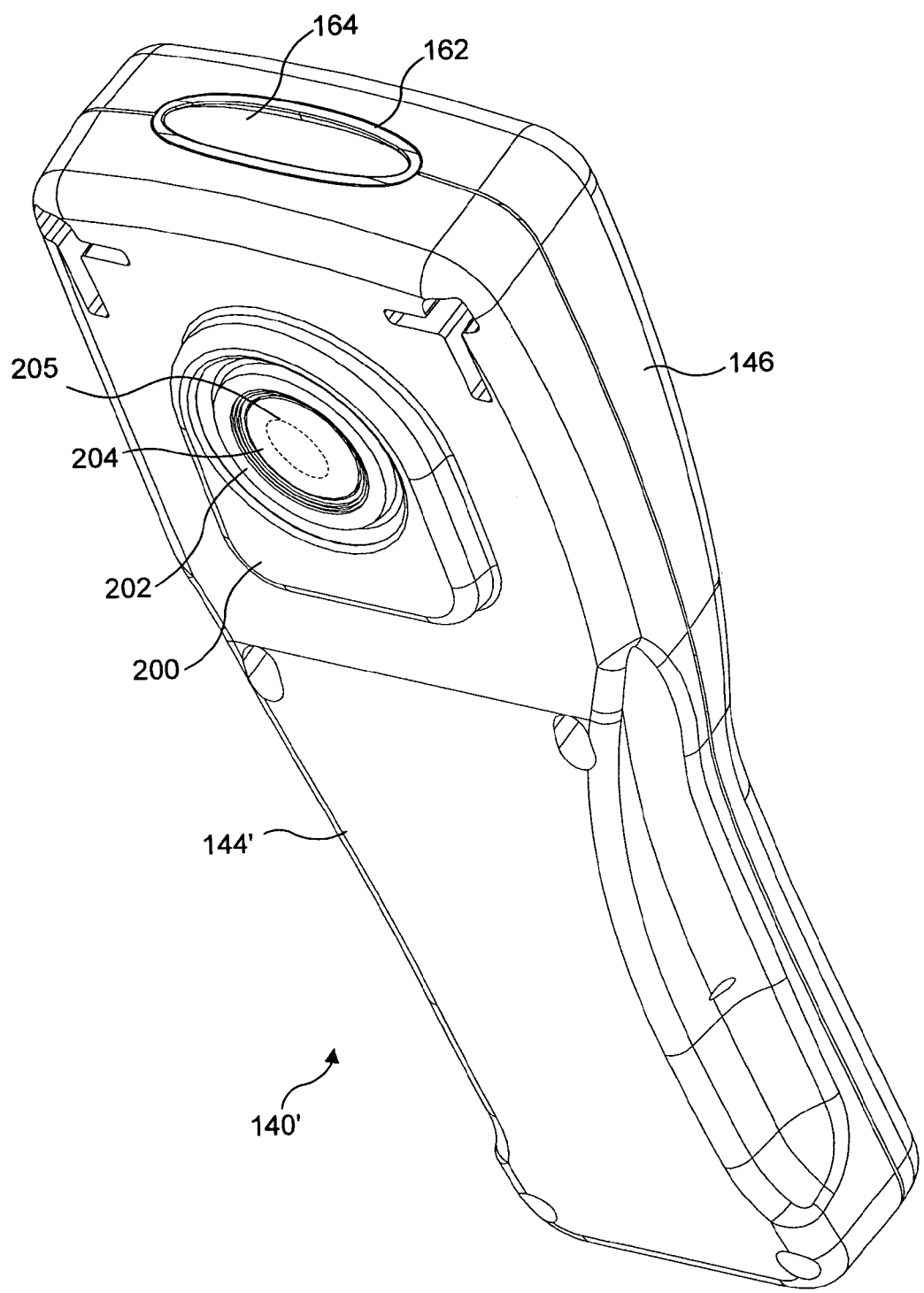
FIG. 10 is an isometric view of the lower surface of a third embodiment of the portable device that includes a digital camera.
Figure 11:
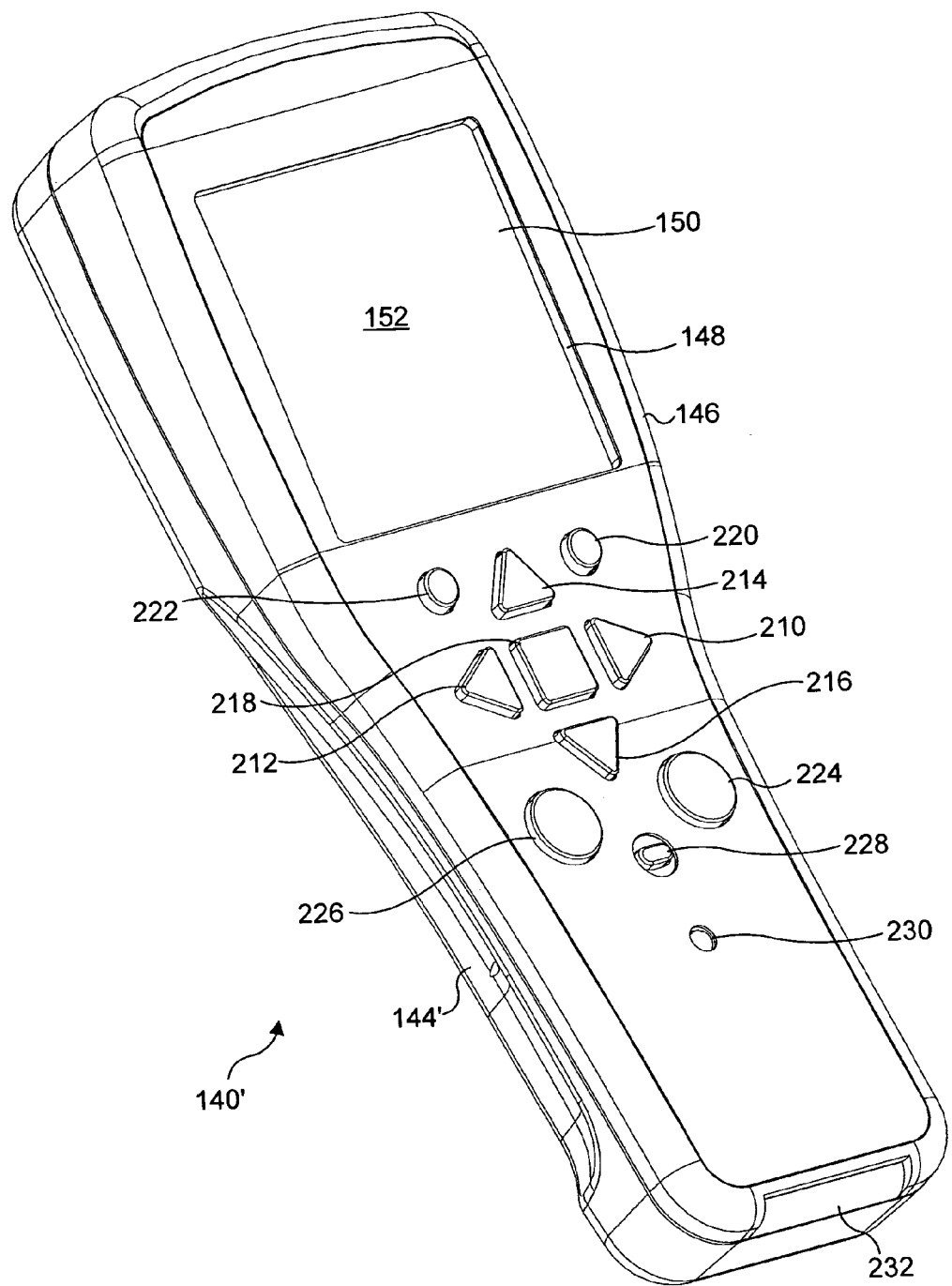
FIG. 11 is an isometric view of the upper surface of either the second or third embodiments.

Two additional embodiments of the portable device are illustrated in FIGS. 8 and 9, and in FIGS. 10 and 11, respectively. A portable device 140, which is shown in FIGS. 8 and 9, has a top housing 142 that is joined to a bottom housing 144 and includes a display bezel opening 148. Only a portion of a top surface 146 of the top housing is illustrated in this Figure, although further details of the top surface are generally similar to the embodiment shown in FIG. 11, which is discussed below.

As clearly illustrated in the exploded view of FIG. 8, a substantially transparent protective plastic window 150 is mounted behind display bezel opening 148 to protect the upper surface of a liquid crystal display (LCD) 152. LCD 152 underlies the protective plastic window and is mounted on a printed circuit (PC) board 154, along with a number of other components (including CPU 62, memory 64, component sensor 46, and control 68, as shown and described above in connection with FIG. 3). A plurality of corner supports 156 engage side tabs 158 on PC board 154. In addition, a plurality of threaded fasteners 160 (only one of which is shown) extend between top housing 142 and bottom housing 144, to secure the two housings together, locking PC board in a position defined by corner supports 156 in cooperation with side tabs 158.

A front bezel 162 is seated at a front end of top housing 142 and bottom housing 144 and includes a lens 164 that is substantially transparent and serves to focus light emitted by a plurality of light emitting diodes (LEDs) 166, which emit white light. LEDs 166 are electrically coupled to PC board 154 by leads 168, which are soldered to appropriate electrically conductive trace connections (not shown) on the PC board 154. An elastomeric seal 170 is fitted around front bezel 162 to seal out dirt, moisture, and other contaminants from the interior of portable device 140. Since LEDs 166 are disposed immediately behind lens 164, the white light emitted by the LEDs is generally focused by lens 164 so that it can be directed by the operator of the portable device onto a component that is being inspected. Such components are sometimes disposed in areas that are not well illuminated by ambient light. Thus, the light from LEDs 166 better enables an operator to use portable device 140 to more clearly see a component that is being inspected and to better observe the condition of the component in order to determine its safety status. Including LEDs 166 on the portable device avoids the need to use a separate flashlight or other source of light to inspect components that are not well lighted by ambient light, or which must be inspected at night.

A portable device 140' is illustrated in FIGS. 10 and 11, and like portable device 140, also includes a light source that can be selectively energized by an operator to illuminate a component that is being inspected, or for other purposes. However, portable device 140' also includes a digital camera 200 that can be selectively activated by a user to record an image, e.g., an image of a component that is being inspected. Accordingly, if an operator makes a decision regarding the safety status of a component or makes a decision to replace a component, a digital image captured by digital camera 200 can provide evidence that justifies the decision made by the operator. Portable device 140' is substantially identical to portable device 140 in most respects, except that it has a lower housing 144' in which digital camera 200 is included. Digital camera 200 has a bezel 202 that supports a lens 204 for receiving light from a component that is being imaged by the digital camera. Not shown is a light sensitive element disposed inside the housing and mounted to an underside of the PC board. The light sensitive element, which may comprise an array of charge coupled devices (CCDs) or a complimentary metal-oxide semiconductor (CMOS), produces digital data corresponding to the light intensity at each pixel within a digital image that is being recorded. Although a higher quality might be achieved with a CCD light sensor, lower cost CMOS light sensors have recently become available that can also be used for the light sensitive device of the digital camera. Such devices are available from a number of different sources and can readily be integrated into portable device 140'.

For purposes of aiming and framing a desired image to be captured by digital camera 200, display 152 is switched to an imaging mode to display an image of the component. When framed as desired, the image shown on the display can be captured in real time, in association with the digital data corresponding to component being imaged and the image data can be stored within memory 64 (FIG. 3) of portable device 140'. It is not expected that an operator will need to record image data for each component being inspected, since only those components having a condition other than "okay" might need to be photographed with the digital camera, as evidence of the status of the component, should any question regarding the operator's decision subsequently arise. The image data produced by digital camera 200 will likely be stored in a compressed format, such as the Joint Photographic Experts Group (JPEG) format, which employs a lossy compression scheme, as is commonly done with other digital cameras. The image data will thus be retained with the other data input by the user during an inspection and will be downloaded to long-term storage with the other data from the inspection.

FIG. 11 illustrates further details of top surface 146 of portable device 140' (and 140). Controls included on the front surface include a Right cursor control button 210, a Left cursor control button 212, an Up cursor control button 214 and a Down cursor control button 216. Centered between these four control buttons is a Read/Enter control button 218, which is depressed when a user wants to enter a selection currently highlighted (selected) on display 152. Since both portable device 140 and portable device 140' include the internal white LED light source, a light power switch 220 is included that can be momentarily depressed by a user to energize the LEDs, to illuminate a component that is being inspected, or to produce light for some other purpose of the operator. Adjacent to Up cursor control button 214 and opposite from light power switch 220 is an Info/Menu button 222 that can be depressed at any time to bring up a current menu on display 152. During the inspection, while viewing the condition of each component being inspected, the user will have an option and will be prompted to press either a green control button 224, which is also pressed to indicate a Yes condition, or a red control button 226, which is also pressed to indicate a No condition.

Neither the second or third embodiments of the portable device include a yellow button. Instead, if the condition of the component is not okay, the operator is simply prompted to select one of several predefined conditions that represent the status of the component being inspected, which can range from a condition in which the component may still be usable, to a condition that justifies immediate repair/replacement of the component. These conditions are presented to the operator on display 152. Using the cursor control buttons, the operator selects the appropriate entry of the condition on the display and depresses Read/Enter control button 218. Furthermore, if the condition of a component is not okay, the operator will be prompted to record a digital image of the component. If the operator presses green button 224 in response to this prompt, display 152 will then switch to the image display mode to show the image that might be captured by digital camera 200. Once the operator has directed lens 204 of the digital camera and positioned the portable device so as to frame the component as desired, as indicated by the image on display 152, the operator depresses Read/Enter control button 218 to capture the image of the component, storing the corresponding image data produced by the digital camera within the memory of the portable device.

A power On/Off switch 228 is disposed between green control button 224 and red control button 226 and slightly offset therefrom. Below the power On/Off switch is a charge indicator 230, for indicating the charge condition of the internal battery supply (not shown) that is contained within the housing of the portable device. A power/data connector port 232 is disposed on an end of the portable device for connecting to an external cradle or docking station, which is discussed in greater detail below. Neither portable device 140 nor portable device 140' include an external stub antenna, as in the first embodiment. Instead, an antenna (not shown) is included internally within the upper and lower housings of the portable device. Use of an internal antenna is preferred, since it avoids potential breakage of an external antenna. It has been determined that an external antenna is not required for sensing RFID tokens. However, like the first embodiment of the portable device described above, portable devices 140 and 140' are used to sense when the portable device is within sufficient range of a token to ensure that the operator is then positioned to inspect a component, to determine the safety status of the component, or to evaluate some other parameter of the component. The other types of tokens and sensors discussed above in connection with the first embodiment of the portable device are also contemplated for use with either the second or third embodiments of the portable device. Accordingly, those options need not be further discussed in regard to portable devices 140 or 140'.

Figure 12:
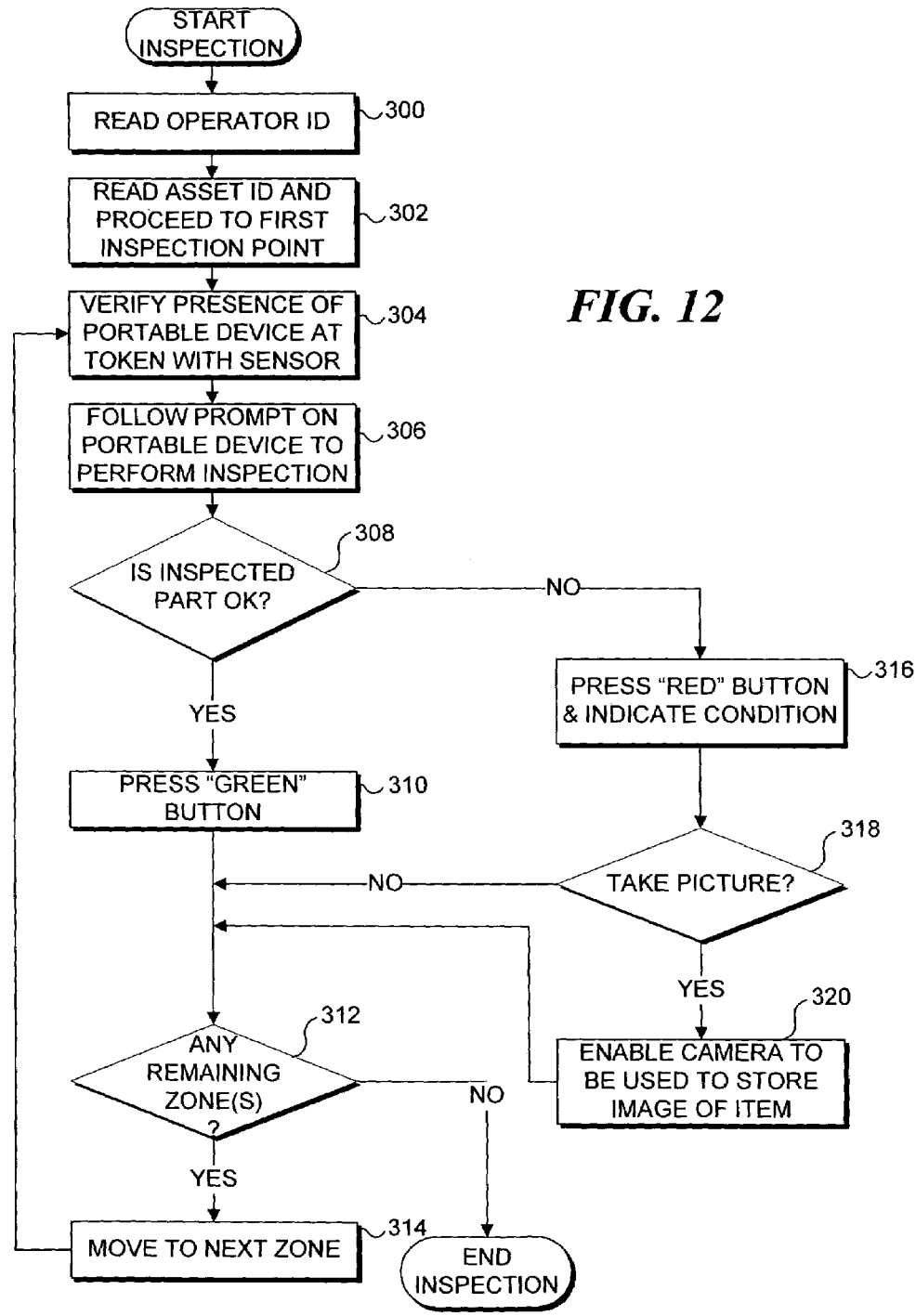
FIG. 12 is a flow chart illustrating the steps implemented during a safety inspection in which the user has an option to record a digital image of a component being inspected.

FIG. 12 illustrates the steps involved in using either portable device 140 or 140' in connection with carrying out an inspection on a vehicle or other type of apparatus or processing facility. Carrying the portable device, an operator starts the inspection, and as indicated in a step 300, uses the portable device to read an operator ID, thereby providing input data identifying the operator who is currently using the portable device. This ID can be read from a token associated with the operator, for example, a token that is carried by the operator on a keychain or as a part of a photo identification card. The operator ID is recorded as part of the data associated with the current inspection and stored in the memory of the portable device for later transmittal and storage at a remote site.

A step 302 then provides that the operator reads an asset ID for the vehicle or apparatus or processing equipment being inspected, which is also stored within the data associated with the current inspection and is provided by reading a token that is attached to the asset. Alteratively, the operator might manually enter an asset ID before undertaking the inspection. Having input the asset ID, the operator proceeds to the first inspection point.

In a step 304, the presence of the portable device (and of the operator) is verified at a token fixed adjacent to the first inspection point. The portable device automatically senses the token and stores data providing proof that the operator had physically carried the portable device to the inspection point associated with the token. Next, a step 306 indicates that a prompt to the operator is displayed on the portable device, indicating the next steps of the inspection to be carried out by the operator. As noted above, a series of inspection steps may be required to complete an inspection of a specific component, or the operator may be prompted to inspect several components that are all associated with the current token. Following step 306, in a decision step 308, the operator determines if the inspected part is okay. If so, the operator presses the green control button on the portable device, as indicated in a step 310. A decision step 312 then determines if there are any remaining zones or points to be inspected during the current inspection and if so, a step 314 provides that the operator moves to the next zone or point where one or more components are disposed that require inspection. The logic then returns to step 304. Alternatively, if there are no remaining zones, the operator has concluded the inspection.

Returning to decision step 308, in the event that the inspected part or component is not okay, the operator would press the red control button at a step 316 and as prompted on the display, would enter or select a condition of the component that led the operator to conclude that its condition was not okay. Display 152 on the portable device would then prompt the operator to decide whether to take a picture of the component (this option only applies to portable device 140) at a decision step 318. If the operator decides to take a picture of the component, a step 320 enables digital camera 200 to be used to create image data for the item. As described above, display 152 shows the image that is to be recorded in real time, enabling the operator to frame the picture by positioning the portable device relative to the component so that the desired image of the component appears on the display. The operator then presses the Read/Enable control button, capturing the image as it thus appears on display 152, so that the image data are recorded within the memory of the portable device. Thereafter, the logic continues with decision step 312. If the user is employing portable device 140 rather than portable device 140', following step 316, the logic would proceed directly to decision step 312, as there would be no option for taking a picture.

Docking Station

Figure 14:
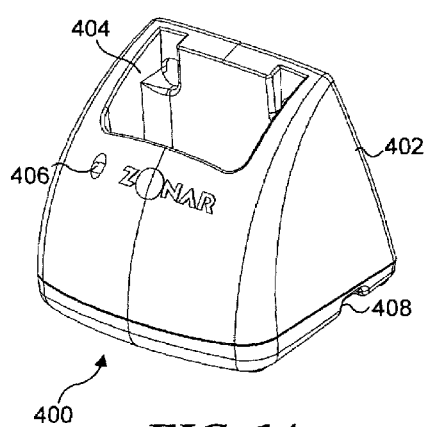
FIG. 14 is an isometric view of a docking station for the portable device.
Figure 15:
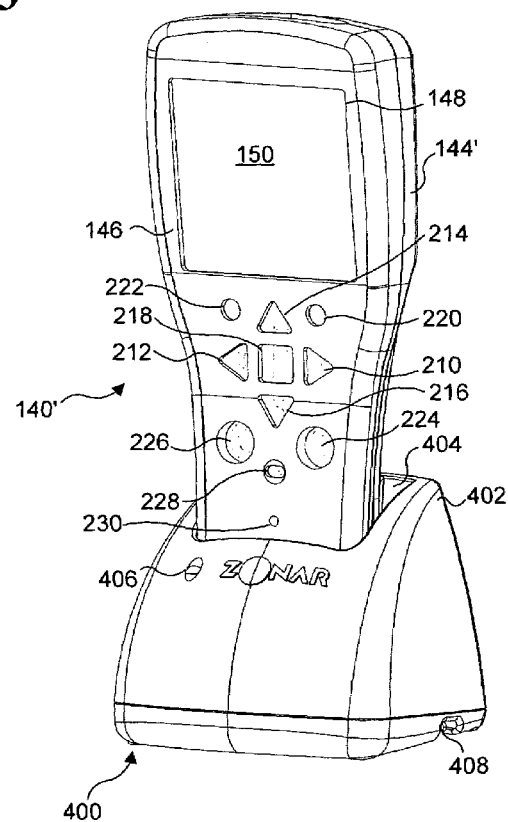
FIG. 15 is an isometric view of the second or third embodiment seated within the docking station for data transfer.
Figure 16:
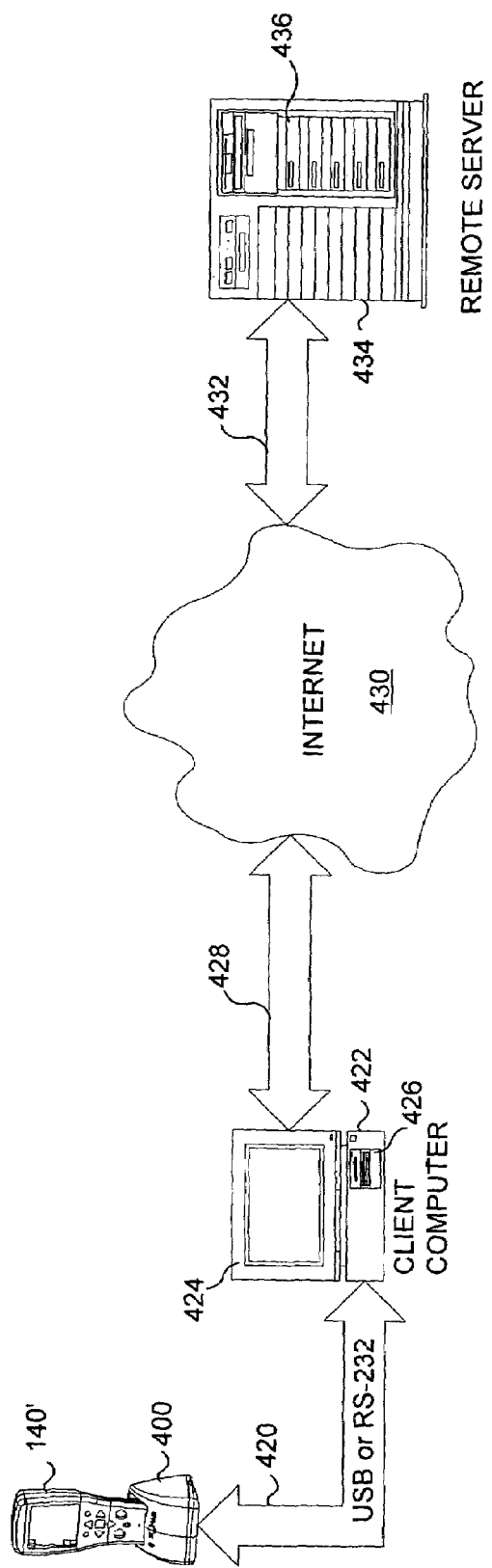
FIG. 16 is a schematic diagram of the system for transferring data over the Internet, between the portable device in the docking station and storage on a remote server.

FIGS. 14 and 15 illustrate a docking station 400 for the portable device of the present invention. Docking station 400 includes a housing 402 having a receptacle 404 into which either portable device 140 or 140' can be fitted. FIG. 15 illustrates portable device 140' inserted within receptacle 404 to facilitate downloading of the data stored within the portable device to a remote storage. Docking station 400 includes an indicator light 406 that changes color to indicate that data are being transmitted from portable device 140 or 140' to another device. Docking station 400 also includes an interface circuit that couples the data port on portable device 140 or 140' to a personal computer 422 through a lead 420, as shown in FIG. 16. The interface circuit converts the data format of portable device 140 and 140' to a universal serial bus (USB) or serial RS-232 format for communication with personal computer 422. Accordingly, data link 420 is connected either to the USB port or serial port on personal computer 422 from a port 408 on docking station 400 (see FIGS. 14 and 15). It is also contemplated that other types of computing devices might be used instead of portable computer 422, and other data formats can be employed, as appropriate. As shown, portable computer 422 has a display monitor 424 and a hard drive 426 for recording data temporarily transferred from portable device 140 and 140'. Subsequently, the data stored on hard drive 426 are downloaded through a data link 428, over Internet 430, and through a data link 432, to a remote server 434, which includes additional storage in the form of a plurality of hard drives 436. It is contemplated that docking station 400 might be disposed in a terminal or other location to which the portable device is returned between inspections or at other times, to transfer data from the memory within the portable device to remote storage on remote server 434.

Data links 428 and 432 can each comprise a telephone modem connection over a telephone network, a wireless data link, a broadband connection through a DSL interface or cable modem, or a cell phone link. Alteratively, personal computer 422 can be directly connected over a local area or wide area network to remote server 434. In general, it is only necessary that the data stored within portable device 140 or 140' resulting from one or more inspections be transferred to a more permanent storage, whether in personal computer 422 or in remote server 434, so that the memory within the portable device is thereafter available to store data from further inspections. By providing remote storage of the data that is downloaded from the portable device from time to time, the security and maintenance of the data are ensured.

Figure 13:
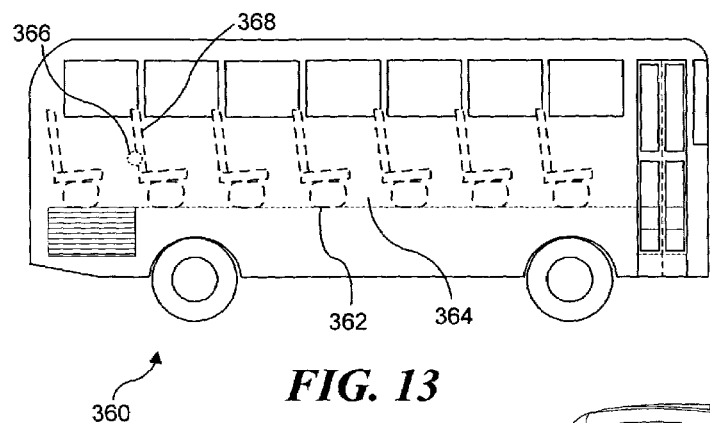
FIG. 13 is a side elevational view of a bus, illustrating the disposition of a token adjacent to a rear of the bus that is scanned to ensure that a driver of the bus has inspected all of the seats to determine whether all passengers have been unloaded from the bus or whether any parcels have been left behind.

FIG. 13 illustrates another aspect of the present invention. For purposes of carrying out safety inspections of a bus 360, which may be a school bus, a last safety check made by the operator (e.g., the driver) might be a check to ensure that all of the passengers have exited from the bus. As shown in FIG. 13, bus 360 includes a plurality of seats 362 at spaced-apart intervals along a aisle 364. To ensure that a child has not fallen asleep or hidden below or behind the seats, at the end of the route, the driver should make a thorough visual inspection of all of the seats in bus 360, which can only be done by walking to the rear of the bus. Accordingly, a token 366 is attached to the back of a seat 368 disposed adjacent to the rear of the bus. By bringing the portable device in proximity with token 366, the operator can thereby confirm that the rear of the bus was visited at the end of a route to ensure that the driver at least had the opportunity to visually confirm that no passengers remained on the bus. If such an inspection is not made, it is possible that a child might remain on a bus when it is returned to a facility for storage, which at the very least, would cause considerable concern to the parents of the child. Thus, the present invention helps to ensure that the driver is motivated to make an inspection to ensure that no child remains on the bus at the end of a route.

An Accessory Embodiment for Use with Portable Computing Devices

While it is likely that an initial preferred embodiment will employ portable device 20, it is also contemplated that an accessory might be provided for a portable computing device, such as a personal digital assistant (PDA), that would enable the portable computing device to be used for generally the same functions as portable device 20. The accessory to the portable computing device should thus include a sensor to detect when the portable computing device is within the predetermined maximum range from the token associated with the component currently being inspected. The conventional controls on the portable computing device can be used to make and enter a selection. Furthermore, instead of using a cursor control, it is also contemplated that a touch screen display (such as those commonly found on PDAs) might instead be used for making selections of menu items and other options presented to the operator on the touch screen display. In addition, the portable computing device must be programmed to carry out the functions implemented by portable device 20, to generally carry out the step described above. Preferably, the portable computing device and accessory should be sufficiently small and lightweight so as to enable a user to carry and manipulate the combination for a period of time sufficient to complete an inspection without undue fatigue.

Figure 17A:
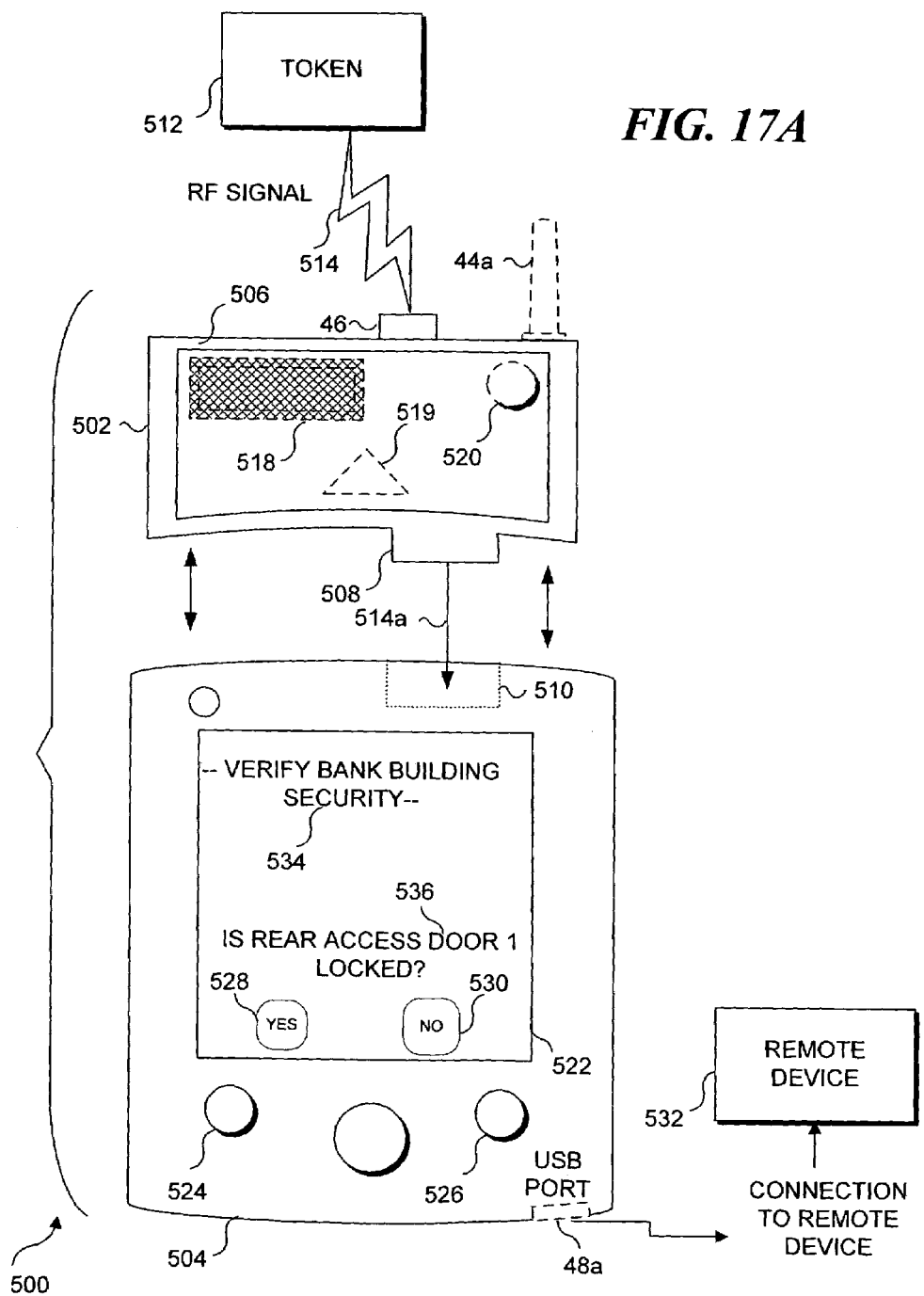
FIG. 17A is a schematic block diagram showing how an accessory is to be coupled to a portable computing device in an alternative embodiment of the portable device.

FIG. 17A schematically illustrates such an accessory for use with a portable computing device. A portable reader 500 is achieved by attaching an accessory 502 to a portable computing device 504, via an interface connection 508. Once the portable computing device is coupled to the accessory, the portable device can be used for the same functions as the portable device embodiments described earlier. As noted above, portable computing device 504 must be programmed to carry out those functions, and in some embodiments is preferably programmed to carry additional functions as described below. In brief, when accessory 502 detects that it is proximate to a token 512 (preferably affixed adjacent to a component that is to be inspected), the accessory transmits a sensor signal 514a to portable computing device 504. The sensor signal is indicative that the operator holding portable reader 500 is positioned such that an inspection of the component can be achieved. Accessory 502 can include a power source (such as a disposable or rechargeable battery), or accessory 502 can be configured to parasitically draw power from the portable computing device.

Once portable computing device 504 has received the signal from accessory 502, the programming of the portable computing device will determine the action that occurs next. In one embodiment, the portable computing device produces a record to be stored in a memory (e.g., on a hard drive) of the portable computing device. As discussed above, all such records stored in the portable computing device can be transferred to a remote storage location, either by using a physical connection (such as a USB port 48a), or a wireless transmission. In another embodiment, the portable computing device is programmed such that no record is produced and stored in the portable device; instead, the portable computing device is programmed to transmit the signal received from the accessory to a remote device (such as a desktop computer coupled to a network) via a wireless transmission. The record can then be generated and stored at the remote device. In this embodiment, the portable computing device preferably includes a transmitter (or radio) enabling the portable computing device to communicate with a remote device wirelessly (or to a router that is coupled to the remote device via a physical connection). While data transmission could occur via a physical connection such as a USB port connection, such a configuration would require the portable computing device to be physically coupled to a network, limiting the mobility of the portable computing device. The wireless communications capability could be implemented using infrared (IR) transmissions, but such transmission is generally limited to relatively short distances. Preferably the wireless communications capability is implemented using longer range technology, such as wireless telephony technology (i.e., any radio frequency transmissions, including microwave transmissions).

Accessory 502 includes a housing 506, sensor 46, and interface connection 508. The sensor is configured to inductively couple to token 512, but alternatively, it may detect the token optically. While sensor 46 is shown as a separate component in FIG. 17A, in another embodiment, the sensor is configured to use antenna 44a to detect the token affixed proximate to the component to be inspected. The interface connection enables the accessory to transmit data, such as sensor signal 514a, to the portable computing device. Interface connection 508 can be implemented as a physical connection (i.e., using male and female electrical contacts, one set of contacts being on the portable computing device and the other set of contacts on the accessory), or a wireless connection. Because the accessory will be in close proximity to the portable computing device (preferably attached to the portable computing device, such that the combination of the portable computing device and the accessory can be carried in one hand), wireless data transmission such as IR data transmission can be beneficially employed. Of course, longer range wireless transmission technology, such as radio frequency transmission or microwave transmission can be employed, but the longer range typically provided by such technologies is not required. The interface connection can also provide means for physically coupling the accessory to the portable device. As shown, interface connection 508 is a port that plugs into a receptacle 510 on the portable computing device. An interference fit between the receptacle and the plug enables the accessory to be removably attached to the portable computing device. While not shown, latches or other securing hardware can be implemented to secure the accessory to the portable computing device. Those skilled in the art will recognize that the physical connection between the accessory and the portable computing device can be configured such that the accessory is joined to the portable computing device at alternative locations, including along the sides, or back of the portable computing device.

Preferably, portable computing device 504 is a PDA, such as a PALM™ PDA. The portable computing device could also be a personal computer or laptop; however, such an implementation may result in a relatively large combination that may be unwieldy for carrying out long inspections. Of course, as the sizes of personal computers continue to decrease (for example, tablet computers are likely to be offered in smaller sizes in the future), the issue of the portability becomes less of a concern for such combinations. The portable computing device employed might already include a transmitter that enables the portable computing device to communicate with another device via a wireless communication, such as the convention WiFi circuitry often provided in accord with the IEEE 802.11a/b/g standards, or newer longer range versions of wireless communication to be provided on portable computing devices in the near future.

Preferably, the accessory can be configured so that it is coupled to a portable computing device, such as a PDA for a first inspection. Thereafter, the accessory can be detached from the personal digital assistant and attached to a different portable device for use in a subsequent inspection. If the accessory is configured to be used with multiple portable computing devices that have different form factors (such as a PDA and a tablet computer), the housing of the accessory is preferably configured to attached to the various multiple form factors of portable computing devices with which the accessory will be used.

Once the interface connection has been properly established between the accessory and the portable computing device, the combination corresponds to portable reader 500. This portable reader can then be used to verify that a user was in a position to conduct almost any type of inspection, of any component, for almost any purpose. Thus, when accessory 502 is within a predetermined maximum distance from token 512, the sensor will produce a signal indicating accessory 502 is within a required range of the component to be inspected. The sensor may be configured to detect the token through a radio frequency signal 514 as shown in FIG. 17A. In the alternative, the sensor can be configured to detect a signal generated by a magnetic field, an electrical field, or an optical pattern, as discussed in detail above, with reference to FIG. 3.

Returning to FIG. 17A, optional components of accessory 502 include a speaker 518, a light indicator 520, and a positioning component 519. Either the speaker or light indicator (or both) can be used to provide an indication to the operator that the accessory is within the predetermined maximum distance from token 512, such that signal 514 is generated. Accessory 502 is preferably configured so that speaker 518 generates an audible tone (or message) whenever signal 514 is generated. Similarly, indicator 520 can optionally be illuminated whenever signal 514 is generated, providing a visual and/or audible indication to the operator, depending upon whether only the indicator or the speaker are energized. A combination of both audible and visual indicators may be preferable to provide a clear verification to the operator that signal 514 has been generated.

If accurate proximity readings of the tokens are required, the positioning component may be employed to provide a longitude coordinate and a latitude coordinate for each token, which can be done regardless of whether the token is disposed at a fixed site or a mobile site. The longitude and the latitude coordinate data for tokens that are located at fixed sites such as railroad, pipeline, fence, or tunnel inspection points would not necessarily provide useful information for inspection reports, since these types of structures are typically located in geographically stable areas so that their position does not change. However, it is possible that this information could be useful in studies to evaluate unstable geographical areas, such as areas that have experienced significant erosion, or in studies to evaluate the movement of glaciers, or shifting of the Earth's tectonic plates. In this scenario, periodic measurement of the GPS coordinates of tokens located in these areas could be of scientific benefit.

However, it is more likely that longitude and latitude data will be useful where such data are obtained from tokens that are disposed on mobile structures (such as vehicles and other types of mobile equipment). For example, if there is a requirement that vehicles need to be inspected each time they enter a specific geographic area, this data will provide evidence that the vehicle was inspected in that area. In the alternative, if a vehicle is stolen, a review of areas in which and the times at which the stolen vehicle has been driven may be helpful in determining patterns of theft. To illustrate the benefit of this approach, a trucking company may notice a higher than unusual incidence of theft or vandalism occurring on vehicles in their fleet records when driven through certain cities or neighborhoods. Thus, the pattern identified by the location data may lead the company to bolster security measures on vehicles when the vehicles are driven in certain geographical locations.

The positioning component can be implemented by using a GPS receiver that receives positional data from the satellite-based navigation system maintained by the U.S. Government, or by using similar systems. GPS receivers are configured to receive signals from a plurality of different satellites and to use those signals to determine a position of the GPS receiver. Alternatively, the positioning component may be a component capable of triangulating signals from a plurality of cellular telecommunication towers in order to similarly determine the location of the positioning subsystem component.

Once signal 514 has been generated, accessory 502 will convey the signal to portable computing device 504 via interface connection 508. Preferably, portable computing device 504 will then display operator prompts on a visual display 522, e.g., concerning the component being inspected (as discussed in detail above). The operator can use conventional controls 524 and 526 on the portable computing device to respond to such prompts. In the alternative, the operator may respond to the prompts by using touch screen indicators 528 and 530. Those skilled in the art will recognize that if the portable computing device is a laptop, that a keyboard associated with the laptop can be utilized to input responses to such prompts.

Once the operator has responded to the prompts on the portable computing device, this data can then be transmitted to a remote device 532 from the portable computing device. The transmission may occur in the form of a download through a hardwired connection. For example, optional USB port 48*a* or an optional serial port (not shown) could be utilized to enable portable computing device 504 to transfer data to remote device 532. The portable device may include a transmitter/receiver, enabling the portable device to communicate wirelessly with a remote device, as noted above. If the portable device does not include a transmitter/receiver, but the accessory does, the portable device can be programmed to use the accessory's wireless transmitter to send data to the remote device. Note that if the accessory is used to transmit data from the portable computing device to a remote device, then the interface connection between the portable device and the accessory must support bi-directional communication.

As described earlier, portable reader 500 can be used to verify that a component was visited for a variety of reasons. First, to illustrate its use for security inspections, a security guard at a financial institution may be given accessory 502 that couples to portable computing device 504 (thus achieving portable reader 500) in order to ensure the security of entrance and exit doors of the financial institution. In this situation, a security guard (the operator) would need to periodically visit each entrance and exit of a bank to check that the doors were locked and check for any evidence of tampering or breakage. When the security guard is within the predetermined maximum distance from a token that is strategically located at the first entrance or exit to be inspected, indicators on the portable reader would become active. If included, light indicator 520 can be made to start flashing when the security guard is sufficiently close to an exit/entrance to check its security. Optionally, speaker 518 could be activated to beep or deliver an audible message to the security guard, such as: "You are within range of this inspection point. Please proceed to the next inspection point."

Although tokens located at vulnerable banking institution exits and entryways are fixed and will not be mobile like tokens mounted on a truck, security specialists may still find it helpful to record the longitude and the latitude coordinate data whenever such tokens are read. This record of token locations may be used to ensure that the security guard's route taken to the specific tokens is indeed random in order to prevent would-be criminals from gaining easy access to the building at a time and place selected based upon observation of the guard's habitual pattern of movement through the building. Thus, a database of the previous routes used by a guard to inspect all tokens that is derived from the longitude and the latitude coordinate data taken for each token during previous inspections can be analyzed to provide a new sequences for token inspections that ensure random route are followed for accessing the tokens. The prompt displayed to the guard can be customized to achieve a random route for the inspection performed by the guard. For example, in this embodiment, portable computing device 504 can be programmed to display appropriate inspection prompts, such as a message 534 ("verify bank building security"), and a message 536 ("is rear access door locked?") on visual display 522, so that the guard is led through the building in the desired random route inspection sequences. If a specialist has determined from analysis of the longitude and the latitude coordinate data that the security guard has been instructed too often to begin the inspection at a north side access door, message 536 prompting an inspection of a south side access door initially can be displayed to ensure a more random and stronger security routine, because inspecting the south side access door first would represent a variation from what always done. In the event that there is a breach of the bank's security, an analysis of both the coordinate data of the token inspected and a timeline should provide a clear indication of where the security guard likely was at all times. Hence, depending on the distances between tokens and thus, the length of time it may have taken the guard to reach another token, insight into how the thieves successfully avoided the guard's route may be gained, and this knowledge can subsequently be used to improve security. Portable computing device 504 can be programmed to enable the operator to manipulate conventional controls 524 and 526 to indicate either a "yes" or "no" response to message 536, or to respond to message 536 using touch screen controls 528 and 530. Because such a security inspection might be considered to be very time-sensitive, rather than downloading the inspection data at a later time via a hardwire connection such as USB port 48*a*, the portable computing device can be programmed to immediately transmit data to remote device 532, indicating a token has been read, using either a transmitter that is part of accessory 502 or included in portable computing device 504. Thus, a central security station (the remote device) can be immediately informed of the results of the latest inspection of the bank building access doors.

Figure 17B:
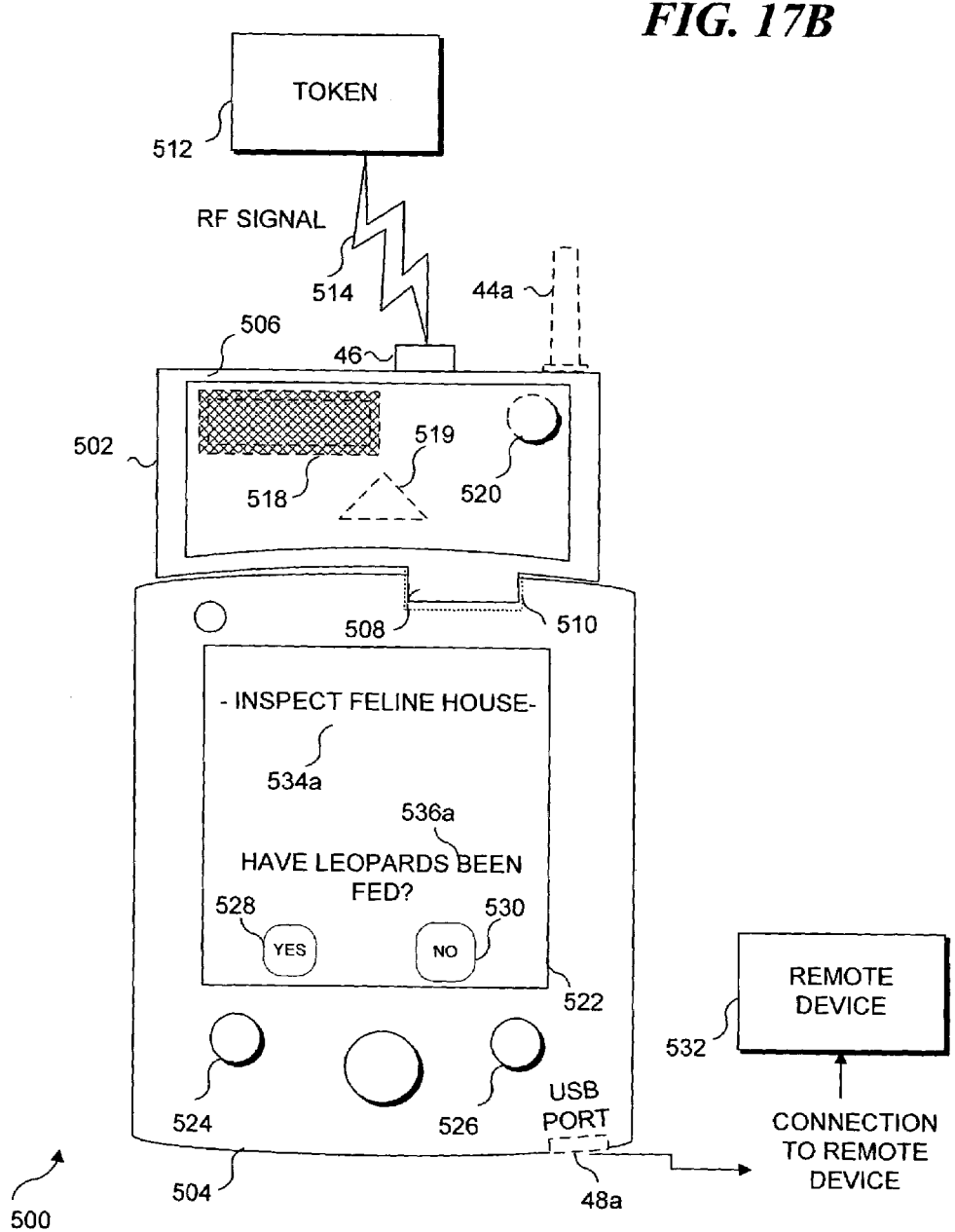
FIG. 17B is a schematic block diagram showing how an accessory is coupled to a portable computing device in another alternative embodiment of the portable device.

FIG. 17B similarly shows portable reader 500, achieved by attaching accessory 502 to portable computing device 504. In FIG. 17B, portable computing device 504 has been programmed to facilitate an inspection of a zoo. Zoo staff can utilize the portable reader to verify that inspections have been made to ensure the diverse zoo residents have clean and properly maintained habitats, and to ensure that feedings and medical care are provided at appropriate intervals. Thus, a zoo staff member may be given accessory 502, coupled to portable computing device 504 (as shown in FIG. 17B) in order to check the feline exhibit at the zoo. When the zoo staff member is within the predetermined maximum distance from a token that is strategically located at a leopard exhibit, the optional indicators can become active (in embodiments where such indicators are included). When present, light indicator 520 can be made blink when the zoo staff person is sufficiently close to the leopard exhibit to ensure that the habitat has been cleaned and that the leopards have been fed. Similarly, when present, portable computing device 504 can be programmed to activate optional speaker 518 to beep, or provide an audible message to the zoo staff member indicating: "You are within range of the leopard exhibit. Please proceed with the inspection." Preferably, portable computing device 504 has been programmed to use display 522 to show a message 534*a* ("inspect feline house"), and a message 536*a* (providing the prompt "have leopards been fed?"). As noted above, portable computing device 504 has preferably been programmed to enable the user to manipulate at least one of conventional controls 524 and 526 or touch screen controls 528 and 530 to indicate a "yes" or "no" response.

Figure 18:
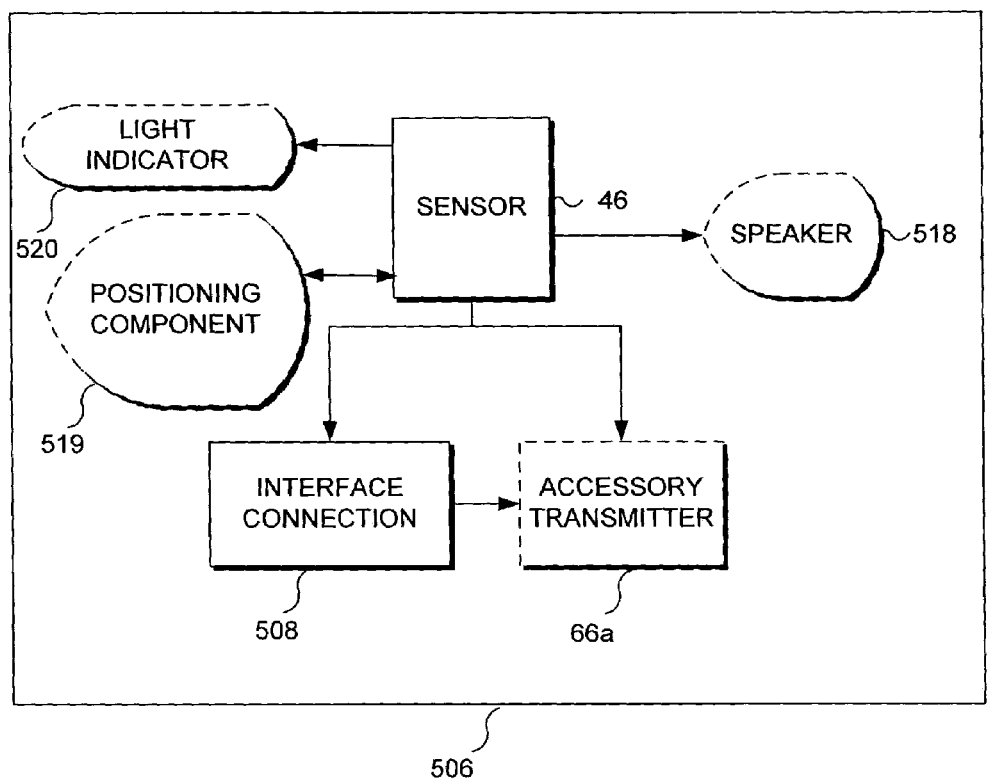
FIG. 18 is a schematic block diagram of the functional components included in the portable device of either FIG. 17A or FIG. 17B.

FIG. 18 illustrates the functional components included in accessory 502, as described in FIG. 17A and FIG. 17B. These components are located either on or within housing 506. Sensor 46 is connected to optional light indicator 520, speaker 518, and connected bi-directionally to positioning component 519 (or alternatively, produces a signal that is used by an intermediate control (not shown) to actuate the optional light indicator and/or speaker and/or positioning component), so that the optional components are activated when the sensor generates a signal. Sensor 46 is also connected to interface connection 508, and an optional accessory transmitter 66a. When sensor 46 detects token 512 (see FIGS. 17A and 17B), it generates sensor signal 514a (see FIGS. 17A and 17B) in response thereto, and that signal is employed for activating optional light indicator 520 and/or speaker 518 and/or positioning component 519, when any combination of these three components are included.

Sensor signal 514a is conveyed to the portable computing device via interface connection 508 (or, the sensor signal can be conveyed to the portable computing device via optional transmitter 66a). If the positioning component is included, positioning data can be provided through the bi-directional connection to the sensor, such that data from the positioning component are conveyed with sensor signal 514a.

In an embodiment where the portable computing device does not include a transmitter/receiver, but the accessory does, interface connection 508 conveys data bi-directionally, such that a record generated by the portable computing device in response to the signal generated by the sensor is conveyed to the transmitter in the accessory to be sent to a remote device for storage.

Figure 19:
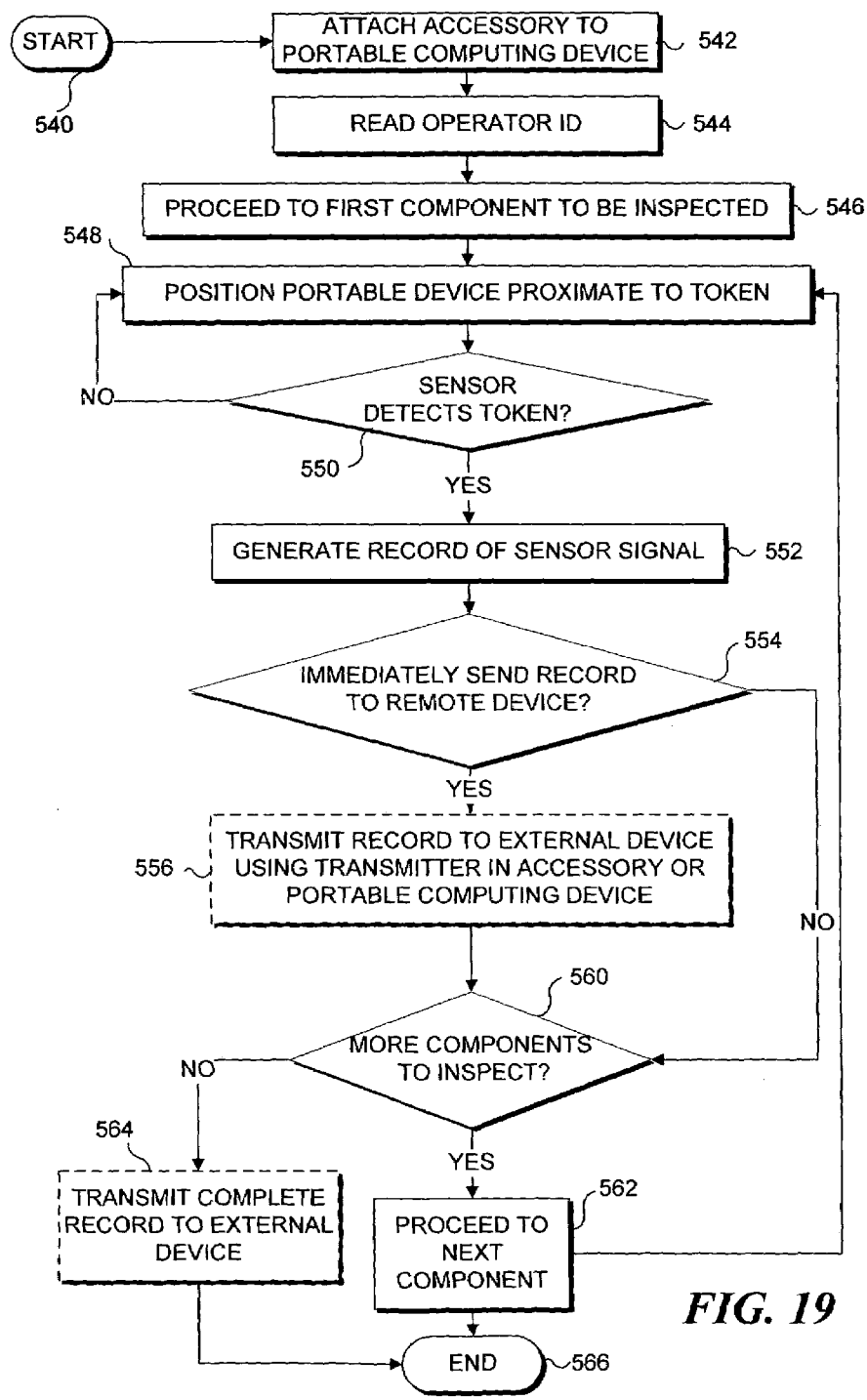
FIG. 19 is a flow chart showing the steps followed in carrying out a component inspection using the accessory coupled to the personal computing device shown in FIG. 17A and FIG. 17B.

FIG. 19 illustrates the logical steps implemented in connection with portable device 500 to carry out an inspection of a component for almost any purpose. The procedure begins at a start block 540, and in a block 542, accessory 502 is attached to portable computing device 504 in order to achieve portable reader 500. This accessory is removably attached, and thus can be detached when the inspection is completed, or may already be attached from a previous inspection. Also, portable computing device 504 must be programmed to process and respond to the sensor signal generated by the accessory. As discussed above, such programming can include configuring the portable computing device to display prompts related to the inspection, to generate a record in response to the signal and store the record in the portable computing device, or alternatively, to generate a record in response to the signal and transmit the record to a remote device, using a transmitter that is part of the portable computing device, or as a still further alternative, to generate a record in response to the signal and transmit the record to a remote device, using a transmitter that is part of the accessory.

Once portable device 500 has been assembled (if not already), the operator may be required to record an operator id, as indicated in a block 544. Then, in a block 546, the operator proceeds to a first component to be inspected. Using the earlier example, a security guard (operator) may need to inspect the entrance and exit doors of a bank building before, during, and/or after banking hours. In such an exemplary application of the present invention, the operator will assemble portable reader 500 and then proceed to the first door that needs to be inspected (for example, to determine if the door is locked or unlocked, or has been tampered with or damaged). In a block 548, the operator positions the portable device proximate the token. In a decision block 550, it is determined whether the sensor detects the token (which is preferably affixed proximate the component to be inspected, as discussed in detail above). If the sensor has detected the token, and the accessory includes the optional speaker, the processor activates the speaker to indicate the signal has been generated. In addition to or as an alternative to the speaker, once the sensor has detected the token, and assuming that the accessory includes the optional light indicator, the processor can activate the light indicator (i.e., causing the indicator to blink, or flash) to indicate the signal has been generated. Furthermore, if the accessory includes the optional positioning component, the processor can activate that component, which will then determine the longitude and the latitude coordinates of the tokens. The display of the portable computing device can also optionally provide a text message confirming that the sensor has read the token and the coordinate data. It should also be understood that (particularly as prices of GPS and other positioning hardware continue to fall) positioning components can be incorporated into the tokens. Where such tokens are employed, the sensor in the reader can be configured to interrogate the positioning components of token, so that the signal generated by the sensor indicating that the token has been successfully read includes positional data (e.g., longitude and latitude coordinates) provided by the token. Where a plurality of tokens are associated with a single structure (such as a truck or an airplane), only one token including a positioning component is required to provide positional data for that structure (i.e., not every token will need to include a positioning component) If, in decision block 550, the operator notes that there has been no indication that the sensor has detected the token, the operator again attempts to position the portable reader proximate the token. After the operator has determined that the sensor has read the token and generated a signal in response thereto, in a block 552 the portable computing device generates a record of the sensor signal. This record is generated when the sensor signal is transmitted to the portable computing device, preferably through the interface connection, or optionally, via an accessory transmitter. The record is evidence that a component was visited during an inspection. Where the reader or token includes a positioning component, the record will also preferably include the longitude coordinate and the latitude coordinate of the component that was inspected.

In a decision block 554, the logic controlling the portable computing device determines if the record is to be immediately transmitted to a remote device. Such immediate transmission will require that either the accessory or the portable computing device include at least a transmitter (unless the portable computing device is coupled to the remote device with a physical connection, which is not likely as such a physical connection will make moving the portable computing device and accessory from one inspection point to the next more difficult), and also, preferably a receiver. If yes, the record is transmitted to a remote device in a block 556, using either a transmitter in the accessory or in the portable computing device. For instance, if the inspection requires the immediate transmission of data from each inspection point, a transmitter can be included in either the accessory of the portable computing device, such that after the operator inspects each entrance or exit (or other inspection point or component), the data record can be transmitted to a server for a central security agency (or other remote device), in order to provide real-time inspection data. Those skilled in the art will recognize, however, that if the portable computing device (or accessory) does have a transmitter, the portable computing device can be programmed to transmit inspection records only after a certain number of components are inspected, or only after all components are inspected.

In a decision block 560, the portable computing device determines if any more components need to be inspected. If so, then a block 562 provides that the operator proceed to the next component, and the steps of blocks 548 through 560 are repeated. If there are no more components to be inspected (and if the record data have not already been transmitted to a remote device), then in a block 564, a record of all of the components visited is transmitted to an external device (wirelessly, via a physical connection, or a combination thereof, as discussed above). When no more components remain to be inspected, the process is completed, as indicated by an end block 566.

A Portable Reader Configured to Provide a Time and Date

The next embodiment is particularly well suited to be used in inspections where detailed inspection prompts are not provided to operators to facilitate an inspection. As discussed in detail above, where a portable reader includes a display, the portable reader can be configured to provide text messages to an operator, to prompt the operator to input a response (such as a condition of the component to be inspected), or to provide the operator with detailed instructions as to the location of the next inspection point. While such functionality is beneficial for many inspections (such as a vehicle safety inspection), many other types of inspections do not require detailed instructions or prompts to be provided to the operator. For example, operators of pipelines that are used to move fluids (such as water, natural gas, petroleum or bulk chemicals) frequently need to inspect many miles of pipeline for leaks and inspection of pipeline related equipment (such as pumping stations). Railroad companies similarly need to inspect many miles of track and track related equipment (signals and switches). Utilities need to inspect many miles of electrical transmission lines, and the towers supporting the lines. Because there will be little variation in the components to be inspected in such inspections, and because there will likely be no need to provide a map to a next inspection point (the inspector simply follows the pipeline, or track, or electrical line), there is much less benefit for a portable reader to provide detailed instructions or maps via a display. For such inspections, simply providing a record, including a time and a date, that verifies that portions of the pipeline, track, or electrical transmission grid that were inspected would be useful. Since these types of structures are stationary, it is unlikely that the positioning component will be included, although such a component can be included if desired. Because of the many miles of pipeline, track, and electrical lines, it would be preferable to minimize the time required at each inspection point. Tunnels and roads are also examples of structures that represent only a few components requiring inspection, but which extend for great distances so that considerable time is required to complete the inspection. A portable reader 578, shown in FIG. 20, is very useful for providing evidence that the operator was present to carry out such inspections.

As shown, portable reader 578 has a generally cylindrical housing 576, because the cylindrical form factor is easier to carry and manipulate than other alternatives. However, other form factors are contemplated as also being useful in practicing the present invention, and the present invention is not intended to be limited to a cylindrical form factor. For example, the housing could be configured as a square with rounded edges, similar to a pager, that readily fits into an operator's hand. Alternatively, this housing could be shaped as a wrist-mounted unit that is intended to be worn on someone's wrist in a manner similar to the way wristwatches are worn. A wrist mounted portable device may be easier to avoid losing, since the cylindrical portable device is similar in shape to a small writing pen or flashlight and can easily be misplaced or lost, as such devices frequently are. Because portable reader 578 is intended to be used in outdoor environments, the housing is preferably weatherproof and durable.

Figure 21:
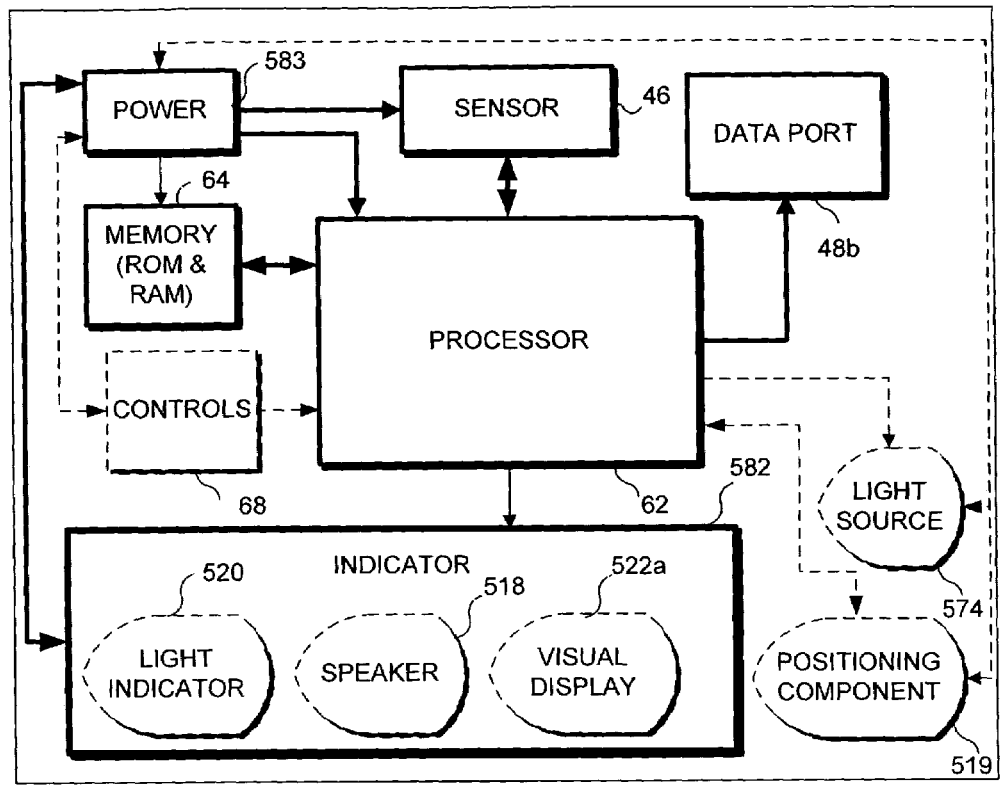
FIG. 21 is a schematic block diagram of the functional components included in the portable device of FIG. 20.
Figure 20:
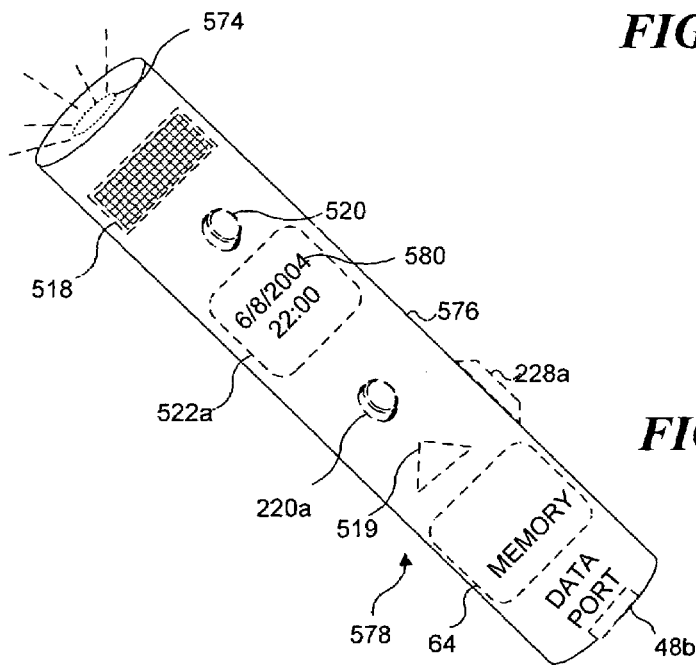
FIG. 20 is a side view of an alternative embodiment of a cylindrical portable device that provides date and time component inspection data.

FIG. 21, which in combination with FIG. 20 illustrates portable reader 578, showing the basic components of portable reader 578, and the most likely optional components. At a minimum, portable reader 578 includes sensor 46 (configured to respond to a token adjacent to a component to be inspected, as discussed in detail above) a memory 64, and a processor 62 (comprising either a software controlled central processing unit (CPU) or a hard wired logic application specific integrated circuit (ASIC)). Processor 62 is configured to generate and store a time and date record, along with a record of the longitude coordinate and the latitude coordinate of each token, if so desired, in the memory whenever sensor 46 generates a sensor signal in response to reading a token and the optional positioning component has been included. Memory 64 preferably includes both random access memory (RAM) and read only memory (ROM), particularly where processor 62 executes machine instructions to control the functionality of the portable reader. Portable reader 578 also includes a power source 583, preferably a rechargeable battery, although disposable batteries can also be employed. Rechargeable batteries are particularly preferred, because such batteries can be recharged in a vehicle, as the vehicle is being used to transport the operator and portable reader 578 to the next inspection point. Preferably, the vehicle is equipped with a docking station that serves as a storage area for portable reader 578 when it is not in use and which is coupled to the vehicle's electrical system to enable the docking station to recharge the batteries of portable reader 578.

FIG. 14 shows a docking station configured to upload data from a portable device. The docking station of FIG. 14 can be modified to match the form factor of portable reader 578 and to recharge batteries and/or to upload data. Upload data from portable reader 578 can be stored in a memory integrated into the docking station (or a memory disposed elsewhere in the vehicle), so that the data from the portable device is regularly backed up, and so that the loss of the portable device would not result in the loss of all inspection data. If desired, and if the vehicle is within range of a remote receiver, the docking station can include a transmitter (or be coupled to a transmitter in the vehicle). Then, by inserting portable reader 578 into the docking station in the vehicle, the records stored in the portable device can be retrieved and transmitted to a remote device. Particularly if a recharging cradle is provided, portable reader 578 will not need an on/off switch, because removing the portable reader 578 from the recharging cradle will turn on portable reader 578, and replacing the portable reader 578 in the recharging cradle will turn off portable reader 578.

Portable reader 578 also minimally includes a data port 48b, which enables records stored in the memory of the portable reader to be uploaded to a remote device. As discussed in detail above, physical connections, such as USB cables and serial data cables can be used to transfer data. Accordingly, data port 48b preferably comprises either a USB port or a serial port, or other appropriate port for transferring data. Data port 48b can as alternatively comprise an IR transmitter, a radio frequency transmitter, a microwave transmitter, or an inductively coupled data transmitter. The data port is used to upload data to a remote device in the operator's vehicle (or to a transmitter in the operator's vehicle), or the data will alternatively remain stored in the portable reader until the operator returns to an office or terminal to upload the data. Uploading data to a vehicle (for storage in the vehicle or transmission to a remote device) is preferred, because if the portable reader is lost, only the data collected since the last upload will be lost.

A component that is not minimally required for functionality, but which is particularly preferred, is an indicator 582 (see FIG. 21), which is configured to indicate to the operator that the sensor has successfully detected a token. If this indicator is not included, it is possible that an operator might move the reader close to the token, but not sufficiently close so as to enable the sensor to read a token. In this case, the operator will likely assume the token has been read, when it actually has not been read. The record will then incorrectly indicate that the operator was not disposed adjacent to the unread token, and thus, could not have inspected the corresponding component. The indicator can comprise a speaker 518, a light indicator 520, or a visual display 522a, or a combination thereof.

In an embodiment that includes speaker 518, the portable reader will activate the speaker to produce an audible prompt indicating that the portable reader has successfully read a token. Such an audible prompt is likely to be very useful in portable reader 578 because a large display screen is not feasible if the size of portable reader 578 is to be kept relatively small. If desired, portable reader 578 can include sufficient memory to store relatively complex audible instructions for the operator, such as voice messages that prompt the operator to proceed to a specific inspection point, to upload any records stored in the portable reader, or to replace or recharge the batteries in the portable reader. For example, the prompt may instruct the operator to "proceed to pipeline component A located at mile marker 35." Once the operator arrives at that point and locates the token that is preferably proximate to the component to be inspected, the audible prompt, for example, may then verify that the component has been accessed by producing an audible message that "component A of mile marker 35 has been accessed (at latitude N3147.55000 longitude W09905.43000); proceed to component B." Alternatively, the speaker can simply emit a distinctive tone that indicates the sensor has successfully just read a token.

Because portable reader 578 has been configured for applications where a large display is not required (i.e., prompts and text data are not required to be displayed to the operator to facilitate an inspection), any visual display included as an indicator will preferably be small and limited to a few characters. An elegant implementation of an indicator is a display 522a that indicates a time and date 580 (i.e., 22:00; Jun. 8, 2004), which is generated in response to a signal from the sensor indicating a token has been read. If the display has the correct time, the operator knows the sensor has read the token. If the time is not displayed, or if the previous date is displayed, the operator will understand that the sensor has not read the token and can reposition the portable reader, as appropriate. Alternatively, speaker 518 can provide a simple audible tone, requiring few memory resources, each time a token is read.

Light indicator 520 can also be used to inform the operator that the sensor has read a token, by illuminating or flashing for a predetermined amount of time, each time a token is read. As noted above, a compact display 522a can be used to indicate that the sensor has read a token, by displaying the most recent time and date that a token was read. Of course, any combination of these three indicators can alternatively be used to indicate to the operator that the sensor has successfully read a token, so that the operator can proceed to the next component.

Optional components for portable reader 578 include an on/off power switch 228a (FIG. 20, and generally indicated as "controls 68" in FIG. 21), Additional optional elements include a light source 574, and a light source power switch 220a (FIG. 20, and generally indicated as the "controls" in FIG. 21). The light source may comprise an incandescent bulb, or more preferably, a white or blue light LED source (for reduced power consumption), as described in connection with the optional light source for portable device 140 and portable device 140', described above. When a light source is included, light source power switch 220 enables a user to activate the light source (to illuminate a component that is being inspected, or to produce light for some other purpose). Such a light source will be extremely convenient for inspecting components in tunnels, or other structures that tend to be dark or poorly illuminated. Because the inspection of pipelines, tunnels, railroads, roads, electrical power lines, and telephones lines will be very time consuming, it is possible that such inspections will not always be finished during daylight hours, particularly where structures must be inspected during the short periods of daylight available in the winter months. Portable reader 578 can optionally include controls (each logically coupled to processor 62), for turning the portable reader on, and for selectively energizing the optional light source.

It should be noted that the minimally required components of portable reader 578 in FIG. 21 are indicated in bold, solid line blocks, while optional components are indicated by dash line blocks. Because indicator 582, while not strictly required, is so particularly preferred, it is shown as a bold, solid line block.

Figure 22:
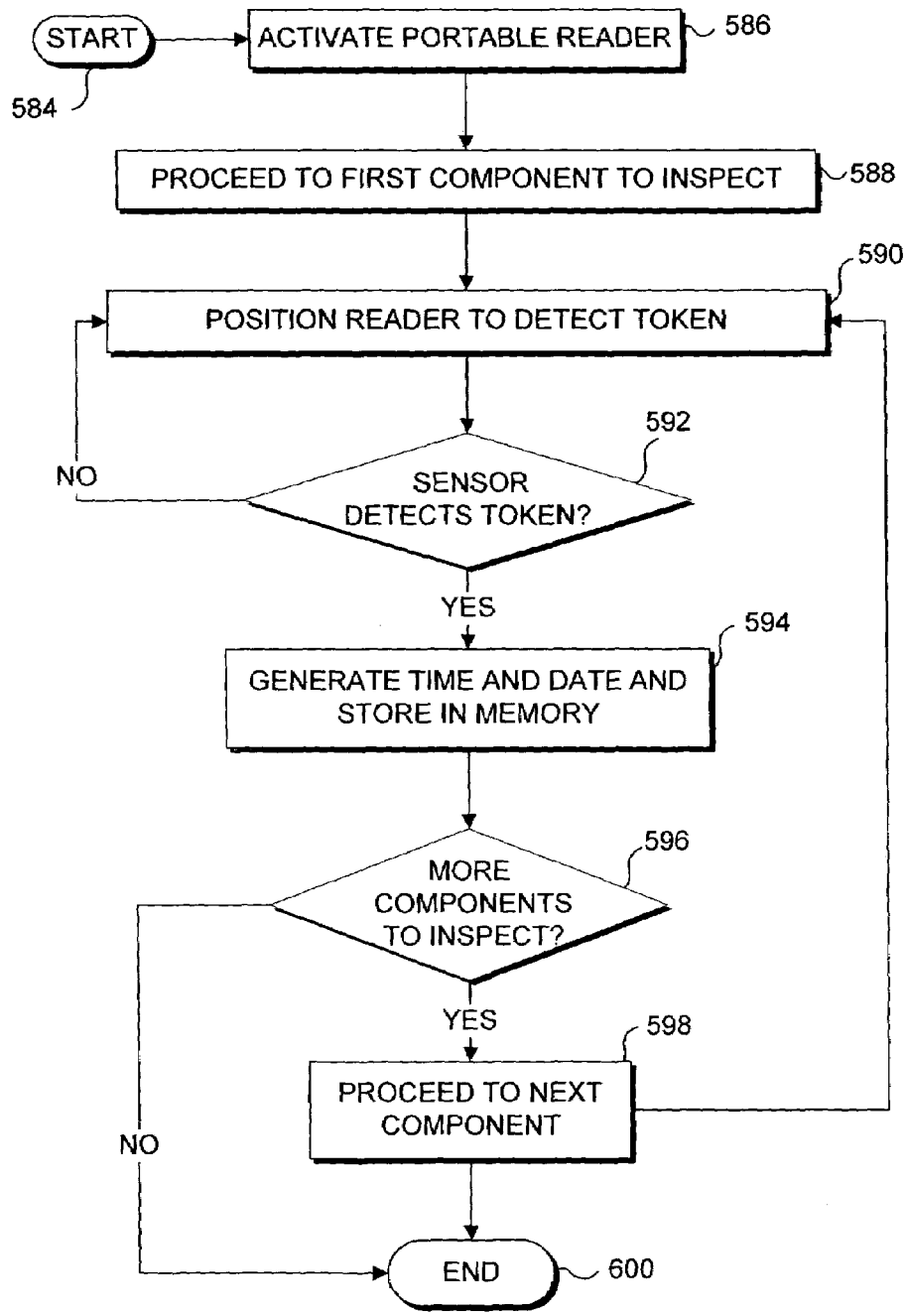
FIG. 22 is a flow chart showing the steps followed in carrying out a component inspection using the portable device described in FIG. 20.

FIG. 22 is a flow chart illustrating the steps followed in carrying out a component inspection using portable reader 578. The logical process begins in a start block 584. In a block 586, the operator activates portable reader 578 (for example, by manipulating optional on/off switch 228a, or simply by removing portable reader 578 from a recharging cradle/docking station). Unlike portable device 500, there is no accessory to be removably attached in order to use portable reader 578 to read a token. In a block 588, the operator moves to a first component (such as a portion of a pipeline, a portion of a road, a portion of a tunnel, or portion of a railroad track, a portion of an electrical transmission grid, or a portion of a telephone network) to perform an inspection. If portable reader 578 includes a speaker (and uses audible prompts stored in the memory of the portable reader), the operator may be audibly prompted to proceed to the first component. For example, in regard to the pipeline and tunnel inspection examples, the operator may hear the audible message of "Proceed to first component in Area 1 of pipeline. Begin inspection," or an audible message: "Proceed to first component in section D of tunnel. Begin inspection." Regardless of the form of the prompt, the operator proceeds to the first component.

In a block 590, the operator positions portable reader 578 proximate to the component. If portable reader includes the optional light source, the operator may find it helpful to energize and use light source 574 to locate the token, assuming that the available ambient light does not make the token readily visible. In a decision block 592, it is determined if the sensor has detected the token. If the portable reader includes optional speaker 518, the operator will hear a message (such as "You have accessed component #1, please proceed to component #2.") or a tone indicating the sensor has detected the token. If optional light indicator 520 is provided, the operator will be able to observe light indicator 520 blinking or being steadily illuminated, thus indicating that the sensor has detected the token. In embodiments including optional display 522a, the operator will be able to observe the current time and date being displayed, thus indicating the sensor has detected the token (if the sensor has not detected the token, then display 522a will be blank, or will display the previous time and date, depending on the programming of portable reader 578). For example, as shown in FIG. 20, component #1 was accessed on Jun. 8, 2004 at 22:00 hours. If the portable reader includes the positioning component, in addition to the time and date that component #1 was accessed, the operator may observe an indication, for example, of a latitude N3037.55000, and a longitude W09805.43000 (not shown in FIG. 20). Any one of these optional techniques for indicating that the sensor has detected a token can be implemented in portable reader 578, and in any combination. If the operator determines that the sensor has not yet read a token, then the operator repositions portable reader 578 (as indicated in block 590), until the operator determines (via one of the indicators described above) that the sensor has detected the token.

Once the portable reader sensor has detected the token, in a block 594 the portable reader will generate the time and date, and optionally, the coordinate data, that will be stored for the inspection. Note that if display 522a is the indicator that alerts the operator that the sensor has detected the token, then the step of generating the record in block 594 occurs concurrently with determining if the sensor has detected the token in decision block 592, because the operator will reposition the portable reader only if the time and date are not displayed (the lack of the current time and date in the display indicates that the sensor has not yet read the token).

Preferably, the time and date are stored in the memory of the portable device, along with a unique identifier corresponding to the specific token that was read at that time and date. Such a record will verify that an operator was proximate a specific inspection point at a specific time and date. If the party tasked with inspecting a pipeline, railroad, tunnel, or an electrical transmission grid is accused of negligence for failing to regularly inspect equipment associated with such structures, the inspection records produced by the present invention can be employed to refute the accusation, by proving that operators were physically present at specific portions of such items, and at specific dates and times. While proof that an operator was present to make an inspection does not prove that an inspection was actually performed, such proof will be clear evidence that the party responsible for such structures did have an inspection plan that was implemented on a routine basis.

Once the time and date are generated, as noted in block 594, as an alternative to storing the time and date in portable reader 578, a wireless transmitter (such as an RF or microwave transmitter) in the portable reader can be used to transmit the data and the time and date in real time to a receiver. Such a receiver could be beneficially incorporated into a work vehicle used by the operator to move from one inspection point (component) to the next. An advantage of such a system would be that the record will be stored in the vehicle, which is much less likely to be lost than the portable reader. A disadvantage is that requiring a transmitter to be including in the portable reader will increase the size and cost of such a device.

After the time and date are generated in block 594, in a decision block 596 it is determined if more components require inspection. If so, the operator proceeds to the next component, as indicated in a block 598, and the steps in blocks 590-594 are repeated for the next component to be inspected. If there are no more components to inspect, the process is complete, as indicated in an end block 600.

A Portable Reader without a Display and Which Provides Audible Prompts

Figure 23A:
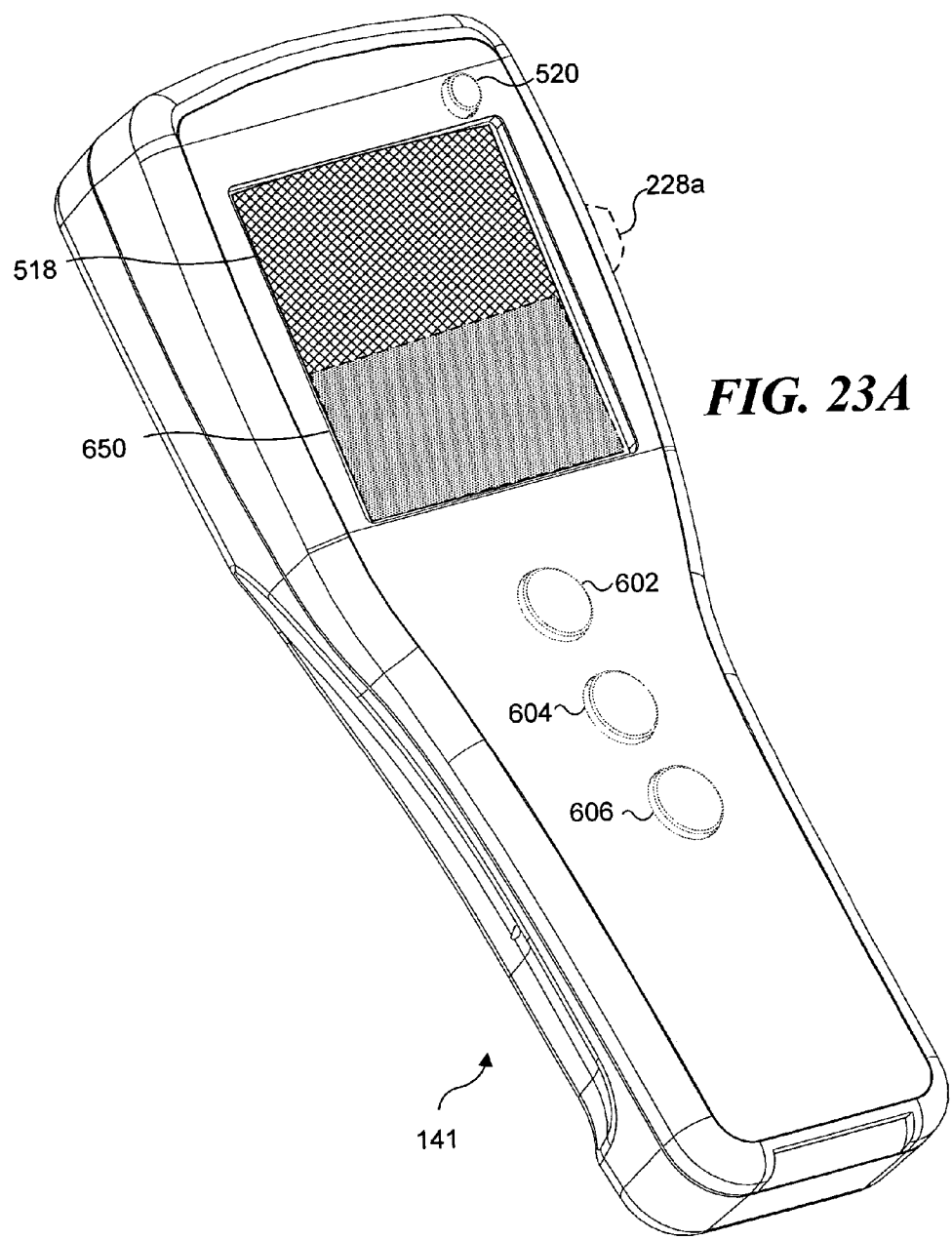
FIG. 23A is an isometric view of the upper surface of a portable device embodiment that provides audible prompts to a user carrying out a component inspection.

The next embodiment of the present invention is particularly well suited for use in inspections where detailed textual prompts or visual diagrams are not needed to facilitate the inspection. While a display will be a desirable element for portable readers employed for many types of inspections, many other types of inspections do not require an interactive display to provide prompts or inspection instructions. Portable reader 141, shown in FIG. 23A, has been configured for making inspections where a display of inspection related data is not required. Instead of including a display to provide prompts and inspection related information to an operator, portable reader 141 includes a speaker, and a memory in which audible prompt data are stored, such that prompts intended to facilitate an inspection are provided audibly, rather than visually. Portable reader 141 shown in FIG. 23A is very similar to the portable devices introduced in FIGS. 8-11. Of course, portable reader 141 can be implemented with a different form factor (such as the generally cylindrical form factor of portable reader 578 of FIG. 20). The minimal required functional components for portable reader 141 include a speaker, a memory, a processor, and a sensor, as described in detail below.

Figure 23B:
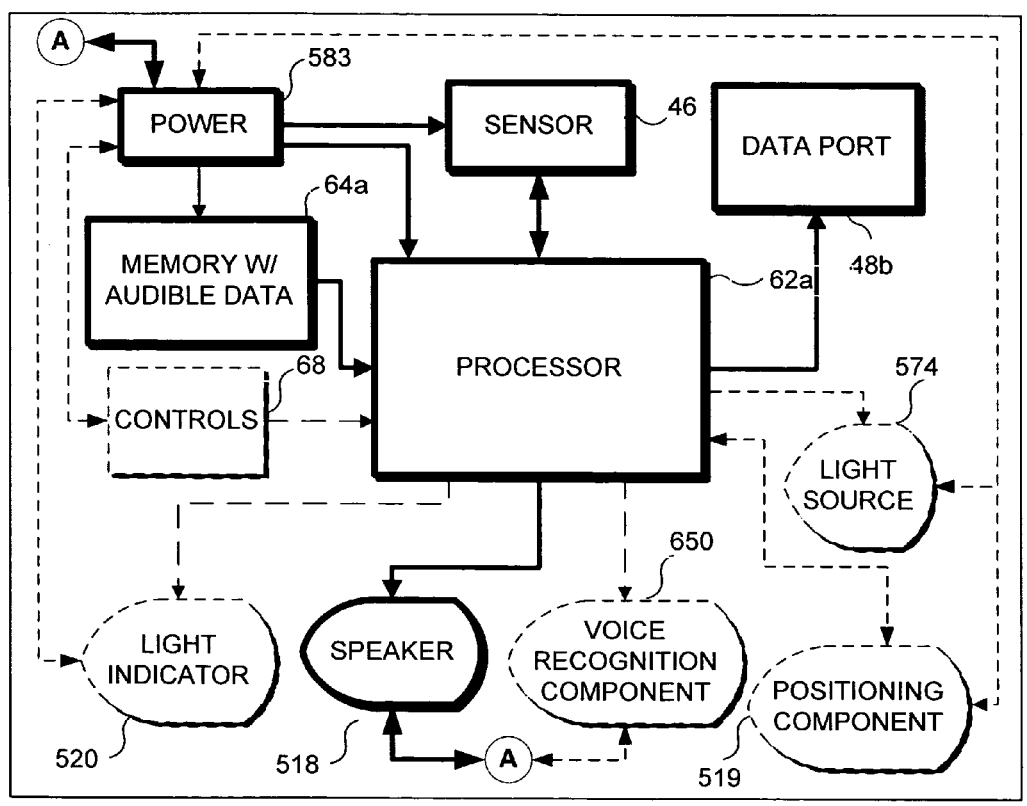
FIG. 23B is a schematic block diagram of the functional components included in the portable devices of FIG. 23A.

FIG. 23A schematically illustrates a preferred form factor for portable reader 141, and show required and optional elements of the portable reader. FIG. 23B is a functional block diagram showing the required and optional elements of portable reader 141. Thus FIG. 23A and 23B, in conjunction with the following description, define portable reader 141. At a minimum, portable reader 141 includes sensor 46 (configured to respond to a token adjacent to a component to be inspected, as discussed in detail above) a memory 64a (which stores data used to generate audible prompts to facilitate an inspection), and a processor 62a (preferably comprising a software-controlled CPU, but alternatively comprising an ASIC). Processor 62a creates a record in response to receiving a signal from the sensor, generally as described above. While such a record will generally be stored in memory 64a, in some embodiments processor 62a can be configured to immediately transmit the record to a remote device, rather than storing the record in the memory 64a. Memory 64a comprises both ROM and RAM, with a portion of the memory being allocated to store the audible data used to generate audible inspection prompts, and a portion of the memory being used to store records created in response to signals from the sensor (indicating a token associated with an inspection point/component has been read). Portable reader 141 also minimally includes speaker 518, which rather than being an optional component (as it is in other embodiments of the present invention), is a required component in this embodiment, because the speaker is used to provide audible inspection prompts to facilitate an inspection.

Portable reader 141 further minimally includes a power source 583, preferably a rechargeable battery, although disposable batteries can alternatively be employed. Rechargeable batteries are particularly preferred, because such batteries can be recharged in a vehicle, and in many instances a vehicle may be used to transport the operator and portable reader 141 between inspection points. Preferably, the vehicle will be equipped with a docking station that stores portable reader 141 when the portable reader is not in use, and which is coupled to the vehicle's electrical system to enable the docking station to recharge the battery power source of portable reader 141. FIG. 14 shows a docking station configured to upload data from a portable reader. The docking station of FIG. 14 can recharge batteries, and if desired, upload data from portable reader 141, so that the data are stored in a memory integrated in the docking station (or a memory disposed elsewhere in the vehicle), and so that the data from the portable device are regularly backed up. Consequently, the loss of the portable device would not result in a loss of all inspection data. If desired, and if the vehicle is within range of a remote receiver, the docking station can include a transmitter (or be coupled to a transmitter in the vehicle), so that inserting portable reader 141 into the docking station in the vehicle results in the records stored in the portable device being retrieved, and transmitted to a remote device. Particularly if a recharging cradle is provided, portable reader 141 will not need an on/off switch, because removing portable reader 141 from the recharging cradle will turn the portable reader on, and replacing the portable reader in the recharging cradle will turn the portable reader off.

Portable reader 141 also minimally includes a data port 48b, which enables records stored in the memory of the portable reader to be uploaded to a remote device. As discussed in detail above, physical connections, such as USB cables and serial data cables can be used to transfer data (and data port 48b is therefore a USB port or serial port, or other suitable port for coupling with a corresponding data input). Data port 48b can alternatively comprise an IR transmitter, a radio frequency transmitter, a microwave transmitter, or an inductively coupled data transmitter. The data port can be used to upload data to a remote device in the operator's vehicle (or to a transmitter in the operator's vehicle), or the data can remain stored in the portable reader until the operator returns to an office or a terminal to upload the data. When an operator uses a vehicle to move between inspection points, uploading data to a vehicle (for storage in the vehicle or transmission to a remote device) is preferred, because if the portable reader is lost or damaged, only the data collected since the last upload will be lost.

The minimally required components of portable reader 141 in FIG. 23B are indicated in bold, solid line blocks, while optional components are indicated by dash line blocks. Optional components for portable device 141 include an on/off power switch 228a (FIG. 23A, and generally indicated as "controls 68" in FIG. 23B), a light indicator 520 (FIGS. 23A and 23B) that illuminates, or flashes to indicate to the operator that the sensor has detected a token, and positioning component 519. The indicator is not required, because portable reader 141 can be configured so that speaker 518 emits a tone or produces an audible message (such as "Token has been read") to indicate to the operator that the sensor has successfully read a token. Additional optional elements include a light source 574, a light source power switch 228a (FIG. 23A, both generally indicated as "controls" in FIG. 23B), and a data interface 48b. As discussed above, the light source can comprise an incandescent bulb or an LED array. Portable reader 141 can also include optional controls 602, 604, and 606 (FIG. 23A, and generally indicated as "controls" in FIG. 23B), and an optional voice recognition component 650. As described above, it may be desirable to provide the operator with detailed audible prompts instead of visual prompts. Voice recognition component 650 enables the user to respond audibly to the prompts instead of responding by manipulating controls 602, 604, and 606. Instead of a voice recognition module, the reader might include only a digital recorder for recording the operator's verbal response, e.g., as a WAV file or using one of the audible compression file formats.

Figure 24:
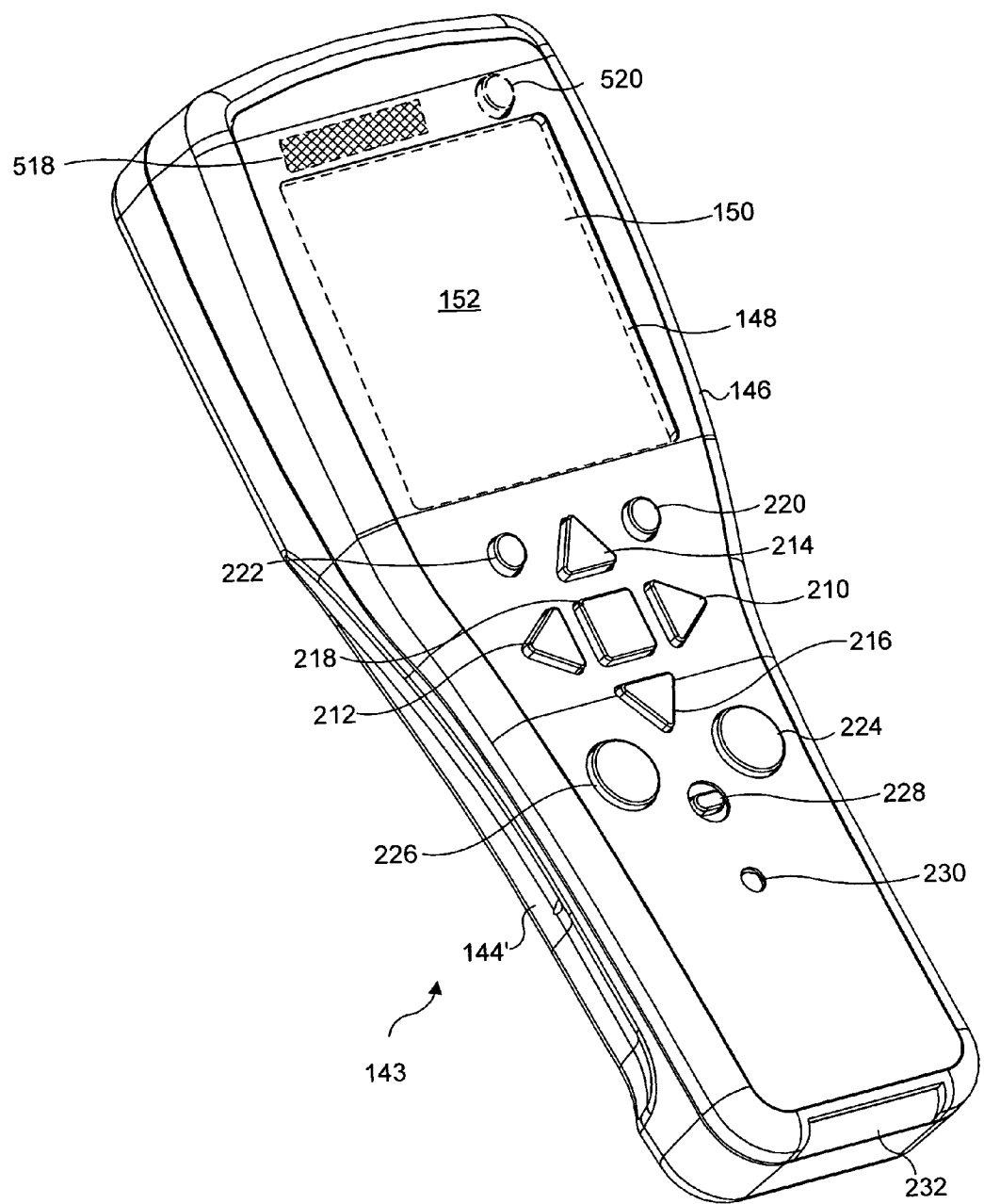
FIG. 24 is an isometric view of the upper surface of an alternative portable device embodiment that provides audible prompts to a user carrying out a component inspection.

FIG. 24 schematically illustrates a portable reader 143 that includes all the elements included in portable reader 141, as well as display 152, and controls such as those described earlier in connection with FIGS. 8-11. While portable reader 141 is likely to be cheaper to produce than portable reader 143 (because a display is not included in portable reader 141), it will be apparent from portable reader 143 that a display can be included, even though audible prompts are employed to facilitate an inspection.

Figure 25:
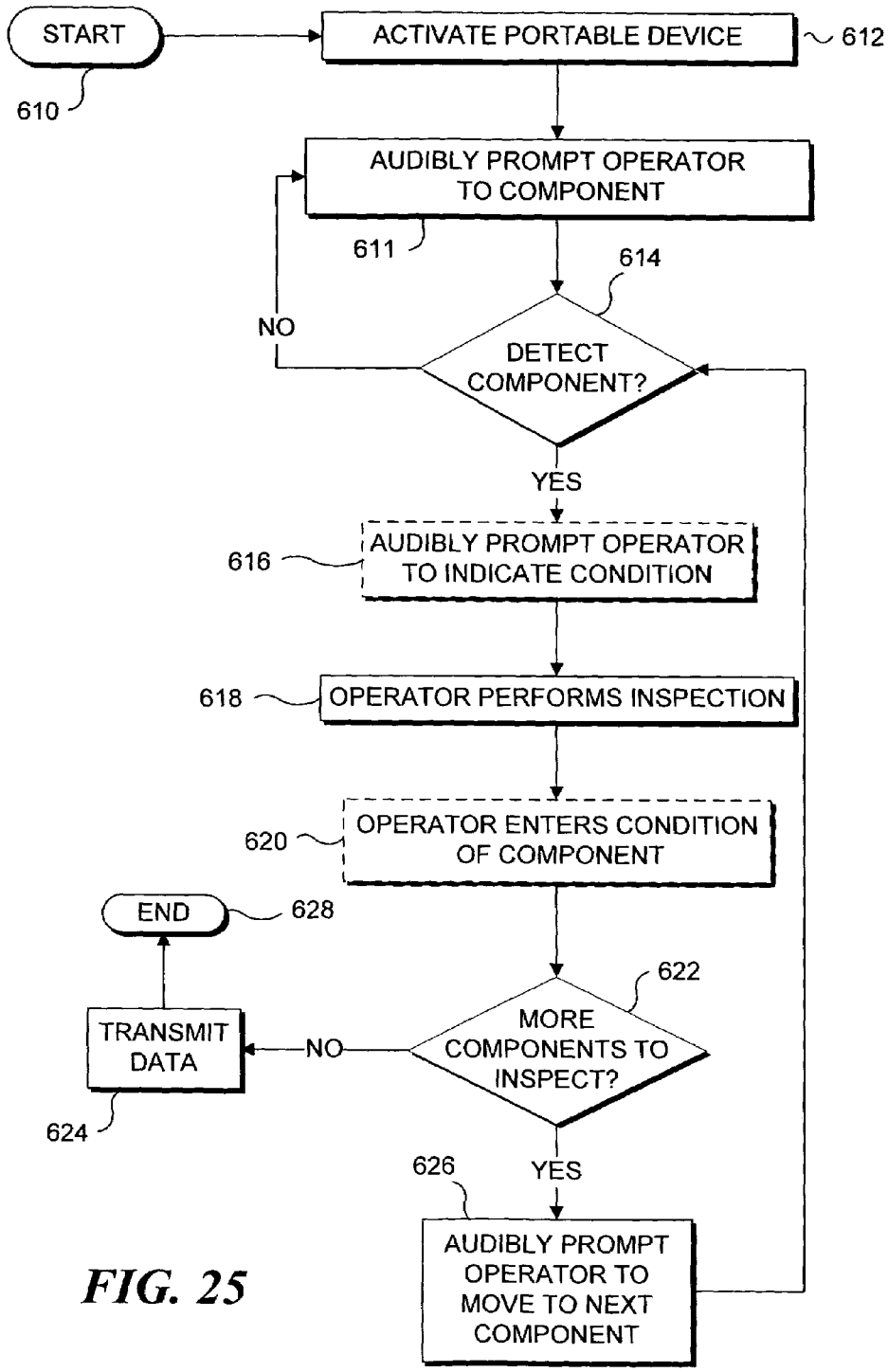
FIG. 25 is a flow chart showing the steps followed in carrying out a component inspection using the portable devices shown in FIG. 23A and FIG. 23B.

FIG. 25 illustrates the logical steps implemented to use portable reader 141 (or portable reader 143) to perform an inspection. In particular, the steps below are described in connection with performing an inspection of fencing used by ranches to control the movement of livestock. Large ranches can employ many miles of fencing, and these fences need to be periodically inspected to reduce loss of livestock, where the fence is down or damaged. Military installations and prisons also use miles of fencing that must periodically be inspected. It should be understood that such an application of the present invention is merely exemplary, and that portable readers 141 and 143 are not limited to use in making such inspections.

Many different audible prompts can be used to guide an operator through an inspection. A first preferred type of audible prompt will instruct the operator to move to the component that is next to be inspected. For example, the audible prompt may instruct the operator to "Proceed to the south fence. Inspect fence post S1001." A second type of preferred audible prompt will indicate to the operator that the sensor has detected a token at a specific location, if the optional positioning component is included. Such an audible prompt may be, "Token read at latitude N3037.55000 and longitude W09805.43000. Proceed to next inspection point," or "Token read. Proceed to fence post S1002." Yet another type of preferred audible prompt will instruct the operator to input data regarding the condition of a specific component. For example, the audible prompt may instruct the operator to respond to the following query: "What is the condition of fence post S1002?" The operator will then manipulate controls (if such optional controls are included in the portable reader) to indicate the relative condition of the component. For example, a red button can indicate a broken component needing immediate repair, a yellow button can indicate a damaged component that remains functional, and a green button can indicate a component in good repair. It should be understood that any combination of the above noted types of audible prompts may be implemented. Further, those of ordinary skill in the art will recognize that many different types of audible prompts, including audible prompts that are unique to a specific inspection, can be employed, and that the audible prompts noted above are exemplary and are not intended to limit the scope of the present invention.

For simplicity, the following description refers only to portable reader 141, although it should be understand that the steps described below similarly apply to the use of portable reader 143. The process of using portable reader 141 begins at a start block 610. In a block 612 portable reader 141 is activated, either by manipulating optional power switch 228a or removing the portable reader from a recharging cradle/docking station. At this point, processor 62a will use the audible prompt data in memory 64a to energize speaker 518 and provide an audible prompt to facilitate the inspection in block 612. For example, the first audible prompt that the operator may hear could be "Proceed to the south fence. Inspect fence post S1001."

In a decision block 614, it is determined if the sensor has detected the token. If portable reader includes visual indicator 520, the indicator will be illuminated, or blink to indicate that the sensor has detected the token to be read. The portable reader can be configured to use speaker 518 to provide an audible indication that the sensor has read the token, such as by producing a beep, or a phrase indicating that the token has been read. If in decision block 614, it is determined that the sensor has not read the token, then the logic loops back to block 611, and an audible prompt is again provided, to prompt the user to move the portable reader closer to the component. If in decision block 614 it is determined that the sensor has detected the token, then in a block 616, a further audible prompt instructs the user to input a condition of the component (in embodiments where the portable reader includes controls enabling such input). In a block 618, the operator performs the inspection, and in a block 620, the operator enters the condition of the component. If portable reader 141 includes optional controls 602, 604, and 606, the operator utilizes controls 602, 604, and 606 to input conditions (for example, manipulating control 602 can indicate the component is in good condition, manipulating control 604 can indicate the component is in marginal but operable condition, and manipulating control 606 can indicate the component is in a non-functional condition). If portable reader 141 includes optional voice recognition component 650, the operator can simply state "good," "acceptable," or "broken" (or some other suitable words). The portable reader can thus be configured to recognize answers that the operator gives in response to a series of questions. While entry of the condition of the component is preferred, it should be noted that the entry of condition data for a component is optional.

Once the condition of the component has been entered (or the inspection of the component has been made in block 618, if no condition entry is to be made) in a decision block 622, processor 62a determines if more components are to be inspected. If so, in a block 626, an audible prompt instructs the operator to move to the next component. Such a prompt can simply indicate that a next component is to be inspected, or the audible prompt can specify what specific component that is next to be inspected. The logic then determines if the sensor has detected the next component, and the sequence of steps from decision block 614 to decision block 622 are repeated. If in decision block 622, it is determined that there are no additional components to inspect, then in a block 624, inspection data collected by portable reader 141 are transmitted to a remote device. As discussed in detail above, such data transmission can be implemented using a hard wire connection, IR data transmission, wireless data transmission (such as an RF or microwave transmission), or any combination thereof. Once the data transmission is completed, the process is concluded, as indicated in an end block 628.

A Portable Reader Configured to Immediately Transmit an Inspection Record

A final embodiment is specifically configured to immediately transmit either the sensor signal, or a record based on the: sensor signal, to a remote device, such that the portable reader need not store an inspection record in a memory within the portable device. Such an embodiment can be used with a remote device configured to receive a transmission from the portable device if the remote device is sufficiently physically close to the portable device during the inspection to receive a transmission from the portable device. For an inspection of a facility such as a building or vessel, such a receiver could be integrated into the building or vessel, so that the receiver for the remote device will clearly be physically close to the portable device and will receive transmissions during the inspection. For inspections of structures such as pipelines, roads, railroad tracks, and electrical transmission lines where an operator will be using a vehicle to move between inspection points, the remote device and receiver can be integrated into the operator's vehicle, which will likely always be sufficiently close to the portable reader to receive such a transmission during the inspection. As noted above, immediately transmitting inspection data to a remote device, as opposed to storing the inspection data in the portable reader (even temporarily), eliminates the possibility that the inadvertent loss or destruction of the portable reader will result in a loss of inspection data recently collected.

Figure 27:
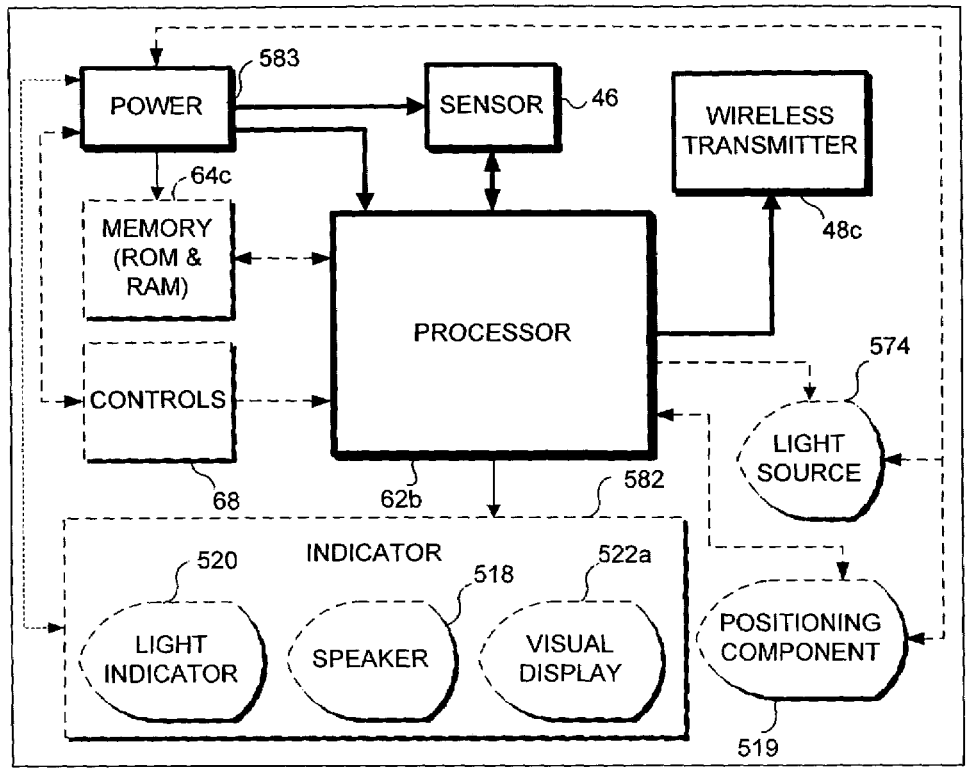
FIG. 27 is a schematic block diagram of the functional components included in the portable device of FIG. 26.
Figure 26:
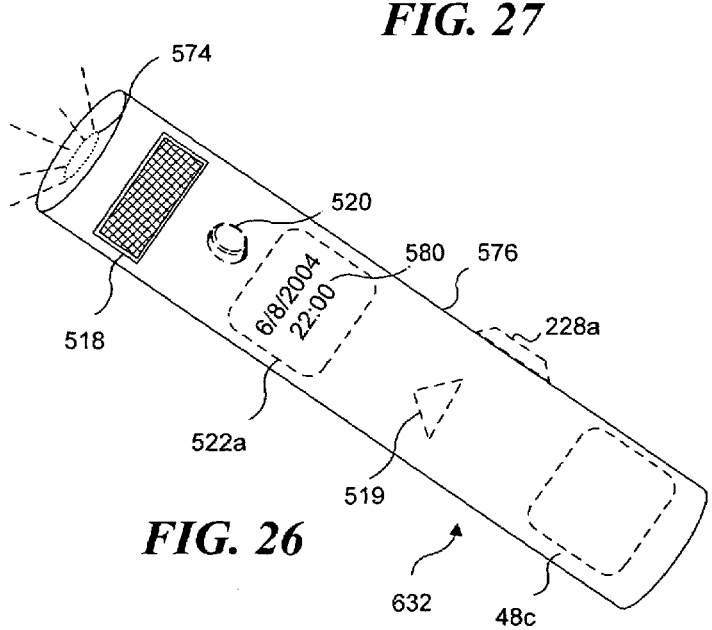
FIG. 26 is an alternative embodiment of a cylindrical portable device that is capable of transmitting time and date component data.

FIG. 26 schematically illustrates one possible form factor for a portable reader 632, which is configured to immediately transmit inspection data, rather than storing the inspection date within the portable reader. FIG. 27 is a block diagram of the functional elements of portable reader 632, in which minimally required elements are indicated by bold solid line blocks, and optional elements are indicated as dash line blocks. While the form factor of portable reader 632 shown in FIG. 26 is very similar to the form factor of portable reader 578 of FIG. 20, it should be understood that the form factor or shape shown is intended to be exemplary, rather than limiting the scope of the present invention.

The minimally required components for portable reader 632 are a power source 583 (such as a battery, as discussed in detail above), sensor 46 (also discussed in detail above), processor 62b, and a wireless transmitter 48c. Processor 62b can comprise an ASIC (in which case no memory is required), or a CPU that executes machine instructions stored in a memory 64c. If processor 62b is implemented as a CPU, the memory included in portable reader 632 only need be employed to store program machine language instructions for controlling the CPU, and is not required to store inspection data. The wireless transmitter preferably comprises a radio frequency, or microwave transmitter. An IR transmitter, while wireless, is not likely to have sufficient range to enable the portable reader to be positioned at a useful distance from a receiver configured to receive the inspection data transmitted from portable reader 632. The dash lines used to indicate wireless transmitter 48c in FIG. 26 simply indicate that the transmitter is an internal component, not an optional component.

Optional components for portable device 632 include an on/off power switch 228a, speaker 518, light indicator 520, visual display 522a, positioning component 519, and light source 574, each of which have been described in detail above in connection with other embodiments. While most embodiments include on/off power switch 228a, as noted above, the portable reader can be configured to automatically be energized when the portable reader is removed from a docking station or a recharging cradle.

Figure 28:
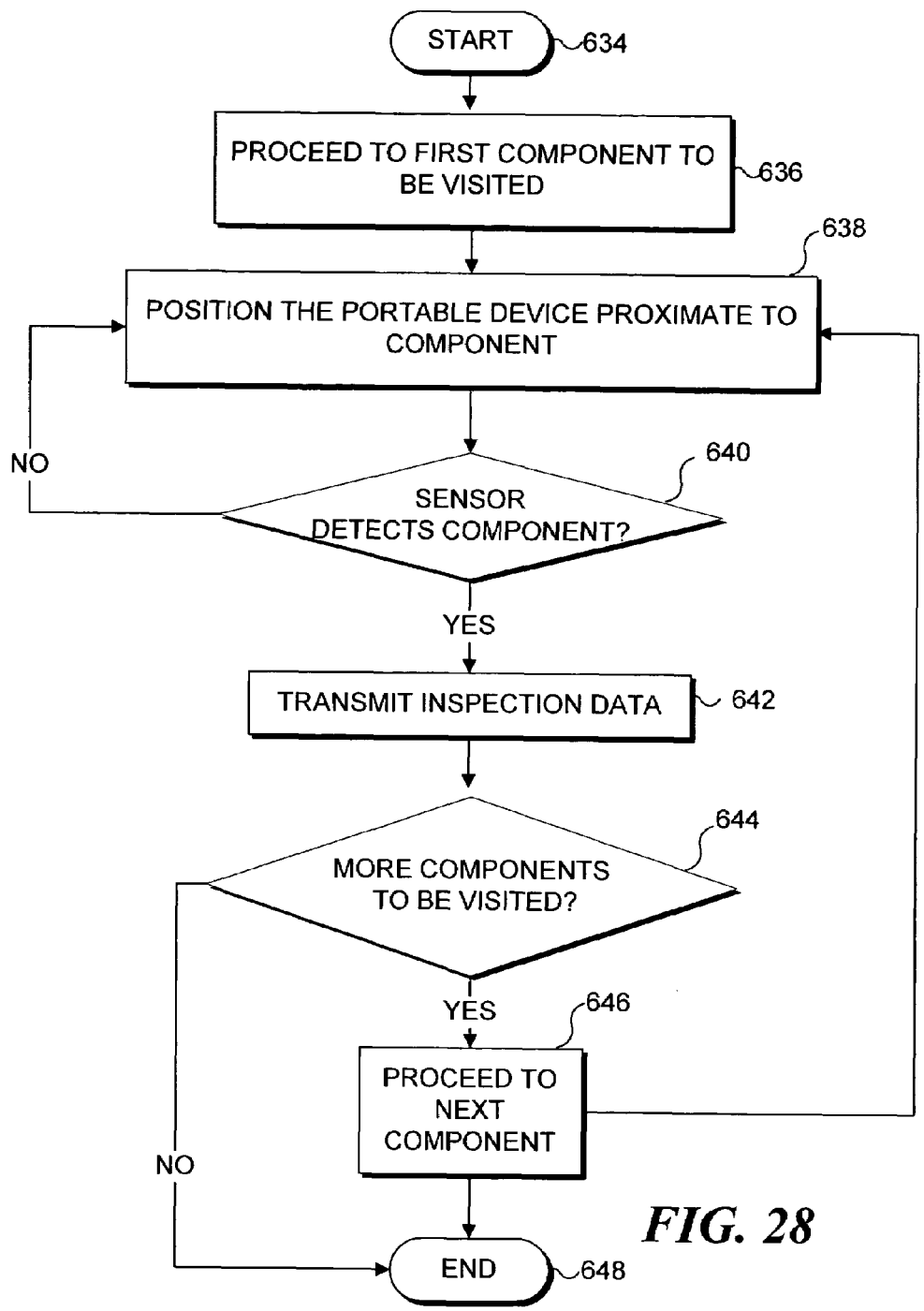
FIG. 28 is a flow chart showing the steps followed in carrying out a component inspection using the portable device described in FIG. 26.

FIG. 28 is a flow chart illustrating the steps followed in carrying out a component inspection using portable reader 632. The process begins in a start block 634, and then in a block 636 the operator proceeds to the first component to be visited. If desired, and portable reader 632 includes a memory and an optional speaker, an audible prompt can be provided. Similarly, if portable reader 632 includes a memory and an optional display, a textual prompt can be provided. In a block 638, the operator positions the portable device proximate to the component. In a decision block 640 it is determined whether or not the sensor has detected the token. Preferably, either optional speaker 518, optional display 522a, or optional visual indicator 520 is used to alert the operator that the detector has read the token. If optional positioning component 519 has been included, the alert will preferably include the GPS coordinates of the token. If the operator does not receive an indication that the sensor has read the token, the operator can reposition the read closer to the token until such an indication is received.

Once the sensor has detected the token, in a block 642, the inspection data are immediately transmitted to a remote device. The inspection data comprise a record generated by processor 62b that identifies the specific token read, and a time and date that the token was read and optionally, the token's GPS coordinates. If desired, and if portable reader 632 includes optional controls that enable an operator to input a condition of the component associated with the token, the inspection data can include condition data input by the operator. The inspection data can instead simply be the signal generated by the sensor, such that the inspection data are generated by a processor in the reader that is coupled to a receiver so that the wireless transmission from portable reader 632 is received and stored with the time and date generated by the receiver. Because such transmissions occur nearly instantaneously, the fact that the time and date are generated by a remote device is irrelevant.

In a decision block 644, it is determined if there are more components to be visited, and if so, the operator proceeds to the next component, as indicated in a block 646. The steps associated with blocks 638-644 are then repeated. Once no additional components remain to be inspected, the process terminates, as indicated in an end block 648.

Other Applications of the Present Invention

The portable readers of the present invention can be used in connection with many different types of inspections. While much of the discussion presented above specifically refers to safety inspections of tractors and trailers in the commercial trucking industry, or to inspections of pipelines, tunnels, railroad track, roads, electrical transmission lines, zoos, buildings, and fences, it should be understood that the portable readers of the present invention are useable for many other types of inspections. There are many other types of safety inspections and security inspection unrelated to the inspections identified above, which can be facilitated by use of one or more of the portable readers in accord with the present invention. Other types of vehicles besides trucks, such as aircraft and buses, can also benefit from use of the present invention to provide proof that the components of the vehicle have been visited and observed by the operator or the person doing an inspection.

Still other applications of the present invention are unrelated to vehicles. For example, in a chemical processing plant or a petroleum refinery, it is common for technicians to make periodic inspections of valves, gauges, reactors, pressure vessels, and other processing equipment and system components to ensure that they are operating properly and within nominal or acceptable limits. During an inspection, a technician may note that a valve is leaking slightly, and schedule it for repair or replacement. Clearly, if the leak is of a non-hazardous substance and is insignificant in volume, there might well be no reason to shut down the process line in which the valve is installed, simply because of the leaking valve. However, if the valve controls an extremely hazardous or toxic substance, even a small leak may be unacceptable. In this case, the technician should immediately report the leaking condition of a valve to a supervisor who would then likely shut down the process or divert the flow of hazardous substance to a different process line, to enable the condition to be corrected by immediate replacement or repair of the valve. Additional applications, without any implied limitation, include the inspection of amusement park rides, such as roller coasters, etc., where the condition of many different components of the ride hardware can directly affect its safety.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. An accessory configured to be coupled to a portable computing device, for use in providing a record that a component was visited during an inspection, comprising:
   (a) a housing;
   (b) a sensor for detecting when the accessory is within a predetermined maximum distance from a component to be inspected, the sensor producing a signal indicative that the accessory is within the predetermined maximum distance from a component;
   (c) an interface connection configured to enable the accessory to communicate data with a portable computing device when the accessory is coupled to a portable computing device, the signal produced by the sensor being conveyed through the interface connection to a portable computing device for at least one of storage thereon and transmission to another device, the signal produced by the sensor thereby providing the record that a component was visited during the inspection; and
   (d) a light source for use in illuminating a component to facilitate its inspection.

2. The accessory of claim 1, further comprising a positioning subsystem configured to determine locational coordinates of the component when the sensor produces the signal indicative that the accessory is within the predetermined maximum distance from the component.

3. A method for providing a record that a component was visited during a safety inspection of a vehicle, comprising the steps of:
   (a) attaching a removable accessory to a portable computing device, the removable accessory including a sensor that detects when the accessory is disposed proximate to the component and producing a signal indicative that the accessory is disposed proximate to the component;
   (b) enabling an operator to move the portable computing device and the accessory attached thereto to a point proximate to the component during the safety inspection of the vehicle; and
   (c) automatically producing a record of the signal produced by the sensor, the record providing evidence that the operator was sufficiently close to the component to inspect the component.

4. The method of claim 3, further comprising the step of determining locational coordinates of the component when the sensor detects that the accessory is disposed proximate to the component.

5. The method of claim 4, wherein the step of automatically producing the record comprises the step of including the locational coordinates of the component in the record.

6. The method of claim 4, wherein the step of determining the locational coordinates of the component record comprises the step of receiving the locational coordinates from a token disposed proximate to the component.

7. A method for providing a record that a component was visited during an inspection, comprising the steps of:
   (a) sensing when a portable device used in recording data related to the inspection is disposed proximate to the component;
   (b) producing a signal indicative that an operator has moved the portable device sufficiently close to the component to enable the operator to inspect the component;
   (c) automatically prompting the operator of the portable device to store an indication of a condition of the component determined by inspecting the component, said indication being stored in the portable device, after sensing that the portable device is disposed proximate to the component; and (d) automatically producing a record of the signal and any indication stored by the operator, said record providing evidence that the operator was sufficiently close to the component to inspect the component.

8. The method of claim 7, wherein the step of automatically prompting the operator to store an indication of the condition of the component comprises the step of using a display on the portable device to prompt the operator to store the indication.

9. The method of claim 8, wherein the step of using the display on the portable device to prompt the operator to store the indication comprises the step of displaying a plurality of different conditions to the operator, such that the operator can select an appropriate condition.

10. The method of claim 7, wherein the step of automatically prompting the operator to store the indication of the component comprises the step of verbally prompting the operator to store the indication of the condition of the component.

11. A method for providing a record that a component was visited during a safety inspection of a vehicle, comprising the steps of:

(a) providing a portable device for use in recording data related to the safety inspection, said portable device including a sensor that detects when the portable device is disposed proximate to the component, producing a sensor signal indicative thereof;

(b) enabling an operator to move the portable device proximate to the component; and (c) automatically producing a record of the sensor signal produced by the sensor that is stored within the portable device, said record providing evidence that the operator was sufficiently close to the component to make a safety inspection of the component.

12. The method of claim 11, further comprising the step of automatically determining locational coordinates of the component when the sensor detects that the portable device is disposed proximate to the component.

13. A system for providing evidence that a passenger compartment of a vehicle was inspected, comprising:

(a) a token disposed adjacent to a rear of the passenger compartment of the vehicle, so that a user must move through the passenger compartment of the vehicle to reach the token, and is thereby positioned while moving through the passenger compartment of the vehicle, so as to observe any person or object within the passenger compartment of the vehicle;

(b) a portable device configured to be transported to the token, the portable device including:

(i) a housing;

(ii) a sensor configured to detect when the portable device is within a predetermined maximum distance from the token, the sensor producing a signal indicative that the portable device is within the predetermined maximum distance from the token; and (iii) a controller coupled to the sensor, the controller creating a data record providing evidence that the token disposed adjacent to a rear of the passenger compartment of the vehicle component was visited during the inspection; and (c) a first memory in which the data record is stored.

14. A method for providing a record that a component was visited during a vehicle safety inspection, comprising the steps of:

(a) providing a portable device used in recording data related to the vehicle safety inspection;

(b) using the portable device, automatically prompting an operator to proceed to the component, where the component is part of a vehicle to be checked during a vehicle safety inspection;

(c) sensing when a portable device used in recording data related to the vehicle safety inspection is disposed proximate to the component;

(d) producing a signal indicative that an operator has moved the portable device sufficiently close to the component to enable the operator to inspect the component; and (e) automatically producing a record of the signal, said record providing evidence that the operator was sufficiently close to the component to inspect the component.

15. The method of claim 14, wherein the vehicle safety inspection includes a plurality of components, and the step of prompting the operator to proceed to the component comprises:

(a) determining that none of the plurality of components has yet been inspected, such that the component the operator is prompted to proceed to corresponds to a first component to be inspected; and (b) determining that another component has already been inspected, such that the component the operator is prompted to proceed to corresponds to a component that has not yet been inspected.

\* \* \* \* \*